United States Patent
Du

(10) Patent No.: US 11,394,637 B1
(45) Date of Patent: Jul. 19, 2022

(54) METHODS, APPARATUSES AND COMPUTER PROGRAM PRODUCTS FOR GENERATING TRANSMISSION PATH OBJECTS BASED ON DATA OBJECT TRANSMISSIONS IN A NETWORK SERVICE CLOUD

(71) Applicants: ATLASSIAN PTY LTD, Sydney (AU); ATLASSIAN INC, San Francisco, CA (US)

(72) Inventor: Haishan Du, Sydney (AU)

(73) Assignees: ATLASSIAN PTY LTD, Sydney (AU); ATLASSIAN, INC., San Francisco, CA (US)

( * ) Notice: Subject to any disclaimer, the term of this patent is extended or adjusted under 35 U.S.C. 154(b) by 0 days.

(21) Appl. No.: 17/247,901

(22) Filed: Dec. 29, 2020

(51) Int. Cl.
*H04L 45/24* (2022.01)
*H04L 45/42* (2022.01)
*H04L 45/02* (2022.01)
*H04L 45/28* (2022.01)
*H04L 45/12* (2022.01)

(52) U.S. Cl.
CPC ............. *H04L 45/24* (2013.01); *H04L 45/02* (2013.01); *H04L 45/12* (2013.01); *H04L 45/28* (2013.01); *H04L 45/42* (2013.01)

(58) Field of Classification Search
CPC ......... H04L 45/42; H04L 45/28; H04L 45/12; H04L 45/02; H04L 45/24
See application file for complete search history.

(56) References Cited

U.S. PATENT DOCUMENTS

| | | | | |
|---|---|---|---|---|
| 2011/0007743 A1* | 1/2011 | Kuwabara | ............... | H04L 69/22 370/392 |
| 2013/0343388 A1* | 12/2013 | Stroud | ................ | H04L 45/7453 370/392 |
| 2018/0367449 A1* | 12/2018 | Pani | ........................ | H04L 45/02 |

OTHER PUBLICATIONS

"Route Priority" [retrieved from internet] undated, <https://docs.aws.amazon.com/vpc/latest/userguide/VPC_Route_Tables.html#route-tables-priority>.
"Route tables and VPN route priority" [retrieved from Internet], <https://docs.aws.amazon.com/vpn/latest/s2svpn/VPNRoutingTypes.html#vpn-route-priority> (undated).

* cited by examiner

*Primary Examiner* — Abdulkader M Alriyashi
(74) *Attorney, Agent, or Firm* — Alston & Bird LLP

(57) ABSTRACT

Various examples herein described are directed to methods, apparatuses and computer program products configured for tracking, tracing, and/or diagnosing data object transmissions in a network service cloud. In some embodiments, a path finder server entity may transmit one or more Application Programming Interface (API) calls to one or more APIs associated with the network service cloud to obtain one or more data routing table objects, and may determine transmission paths of data objects based at least in part on the data routing table objects.

20 Claims, 17 Drawing Sheets

METHODS, APPARATUSES AND COMPUTER PROGRAM PRODUCTS FOR GENERATING TRANSMISSION PATH OBJECTS BASED ON DATA OBJECT TRANSMISSIONS IN A NETWORK SERVICE CLOUD

BACKGROUND

Applicant has identified many technical deficiencies and problems associated with network traffic tracing and diagnosis in complex computer networks.

BRIEF SUMMARY

In general, embodiments of the present disclosure provide methods, apparatus, systems, computing devices, and/or the like for tracking, tracing, and/or diagnosing data object transmissions in a network service cloud.

In accordance with various embodiments of the present disclosure, an apparatus is provided. In some embodiments, the apparatus comprises at least one processor and at least one non-transitory memory comprising program code. In some embodiments, the at least one non-transitory memory and the program code are configured to, with the at least one processor, cause the apparatus to at least: determine a source address metadata and a destination address metadata of a data object associated with a network service cloud, wherein the network service cloud comprises a plurality of data routing nodes; retrieve, based at least in part on the source address metadata, an initial data routing table object, wherein the initial data routing table object defines an initial data routing protocol set; determine, based at least in part on the initial data routing protocol set, first node type metadata and first node identifier metadata associated with a first data routing node; transmit, based at least in part on at least one of the first node type metadata or the first node identifier metadata, a first Application Programming Interface (API) call request to a first API associated with the network service cloud for a first data routing table object associated with the first data routing node; in response to receiving a first API call response comprising the first data routing table object, determine second node type metadata and second node identifier metadata associated with a second data routing node based at least in part on the destination address metadata and the first data routing table object; and generate a transmission path object representing a data object transmission associated with the data object based at least in part on the first node type metadata, the first node identifier metadata, the second node type metadata, and the second node identifier metadata.

In some embodiments, when retrieving the first data routing table object, the at least one non-transitory memory and the program code are configured to, with the at least one processor, cause the apparatus to: determine whether the source address metadata satisfies a first network address range associated with an initial data routing node of the plurality of data routing nodes.

In some embodiments, the first network address range is defined by at least one network address allocation protocol associated with the initial data routing node.

In some embodiments, the at least one non-transitory memory and the program code are configured to, with the at least one processor, cause the apparatus to: in response to determining that the source address metadata satisfies the first network address range, retrieve the first data routing table object corresponding to the first network address range.

In some embodiments, the at least one non-transitory memory and the program code are configured to, with the at least one processor, cause the apparatus to: in response to determining that the source address metadata does not satisfy the first network address range, generate an error notification.

In some embodiments, the at least one non-transitory memory and the program code are configured to, with the at least one processor, cause the apparatus to: in response to determining that the source address metadata does not satisfy the first network address range, determine whether the source address metadata satisfies a second network address range associated with an alternative data routing node of the plurality of data routing nodes.

In some embodiments, the initial data routing protocol set defines a plurality of destination address ranges. In some embodiments, when determining the first node type metadata and the first node identifier metadata, the at least one non-transitory memory and the program code are configured to, with the at least one processor, cause the apparatus to further: select, based at least in part on the source address metadata, a longest matching destination address range from the plurality of destination address ranges; and determine the first node type metadata and the first node identifier metadata corresponding to the longest matching destination address range.

In some embodiments, the transmission path object defines at least a transmission path from the first data routing node to the second data routing node.

In some embodiments, the at least one non-transitory memory and the program code are configured to, with the at least one processor, cause the apparatus to: determine whether the second node type metadata corresponds to a predefined final node type.

In some embodiments, the at least one non-transitory memory and the program code are configured to, with the at least one processor, cause the apparatus to: in response to determining that the second node type metadata corresponds to the predefined final node type, associate the second node identifier metadata with a target node indication.

In some embodiments, the at least one non-transitory memory and the program code are configured to, with the at least one processor, cause the apparatus to: in response to determining that the second node type metadata does not correspond to the predefined final node type, transmit, based at least in part on the second node type metadata, a second API call request to a second API associated with the network service cloud for a second data routing table object associated with the second data routing node; and in response to receiving a second API call response comprising the second data routing table object, determine third node type metadata and third node identifier metadata associated with a third data routing node.

In some embodiments, the at least one non-transitory memory and the program code are configured to, with the at least one processor, cause the apparatus to: generate the transmission path object representing the data object transmission based further on the third node type metadata and the third node identifier metadata, wherein the transmission path object defines at least a first transmission path from the first data routing node to the second data routing node and a second transmission path from the second data routing node to the third data routing node.

In some embodiments, the first data routing table object comprises a first data routing protocol set, wherein the at least one non-transitory memory and the program code are configured to, with the at least one processor, cause the apparatus to: in response to determining that the second data routing node is associated with a faulty status, update the first data routing protocol set.

In some embodiments, when updating the first data routing protocol set, the at least one non-transitory memory and the program code are configured to, with the at least one processor, cause the apparatus to: determine third node type metadata and third node identifier metadata associated with a third data routing node, wherein the first data routing table object defines at least a transmission path from the first data routing node to the third data routing node.

In accordance with various embodiments of the present disclosure, a computer-implemented method is provided. In some embodiments, the computer-implemented method comprises: determining a source address metadata and a destination address metadata of a data object associated with a network service cloud, wherein the network service cloud comprises a plurality of data routing nodes; retrieving, based at least in part on the source address metadata, an initial data routing table object, wherein the initial data routing table object defines an initial data routing protocol set; determining, based at least in part on the initial data routing protocol set, first node type metadata and first node identifier metadata associated with a first data routing node; transmitting, based at least in part on at least one of the first node type metadata or the first node identifier metadata, a first API call request to a first API associated with the network service cloud for a first data routing table object associated with the first data routing node; in response to receiving a first API call response comprising the first data routing table object, determining second node type metadata and second node identifier metadata associated with a second data routing node based at least in part on the destination address metadata and the first data routing table object; and generating a transmission path object representing a data object transmission associated with the data object based at least in part on the first node type metadata, the first node identifier metadata, the second node type metadata, and the second node identifier metadata.

In accordance with various embodiments of the present disclosure, a computer program is provided. In some embodiments, the computer program product comprises at least one non-transitory computer-readable storage medium having computer-readable program code portions stored therein. In some embodiments, the computer-readable program code portions comprise an executable portion configured to: determine a source address metadata and a destination address metadata of a data object associated with a network service cloud, wherein the network service cloud comprises a plurality of data routing nodes; retrieve, based at least in part on the source address metadata, an initial data routing table object, wherein the initial data routing table object defines an initial data routing protocol set; determine, based at least in part on the initial data routing protocol set, first node type metadata and first node identifier metadata associated with a first data routing node; transmit, based at least in part on at least one of the first node type metadata or the first node identifier metadata, a first API call request to a first API associated with the network service cloud for a first data routing table object associated with the first data routing node; in response to receiving a first API call response comprising the first data routing table object, determine second node type metadata and second node identifier metadata associated with a second data routing node based at least in part on the destination address metadata and the first data routing table object; and generate a transmission path object representing a data object transmission associated with the data object based at least in part on the first node type metadata, the first node identifier metadata, the second node type metadata, and the second node identifier metadata.

The above summary is provided merely for the purpose of summarizing some example embodiments to provide a basic understanding of some aspects of the disclosure. Accordingly, it will be appreciated that the above-described embodiments are merely examples and should not be construed to narrow the scope or spirit of the disclosure. It will be appreciated that the scope of the disclosure encompasses many potential embodiments in addition to those here summarized, some of which will be further described below.

BRIEF DESCRIPTION OF THE DRAWINGS

Figure 1:
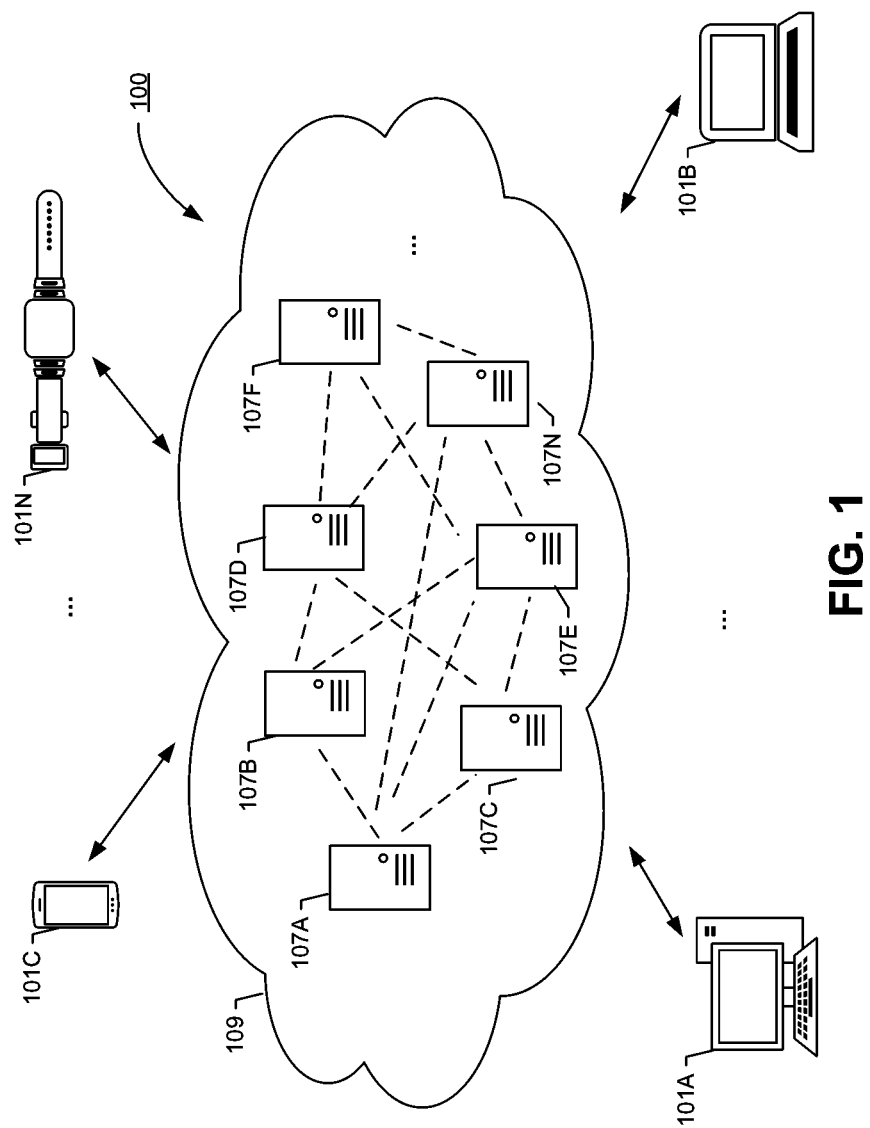
Figure 2:
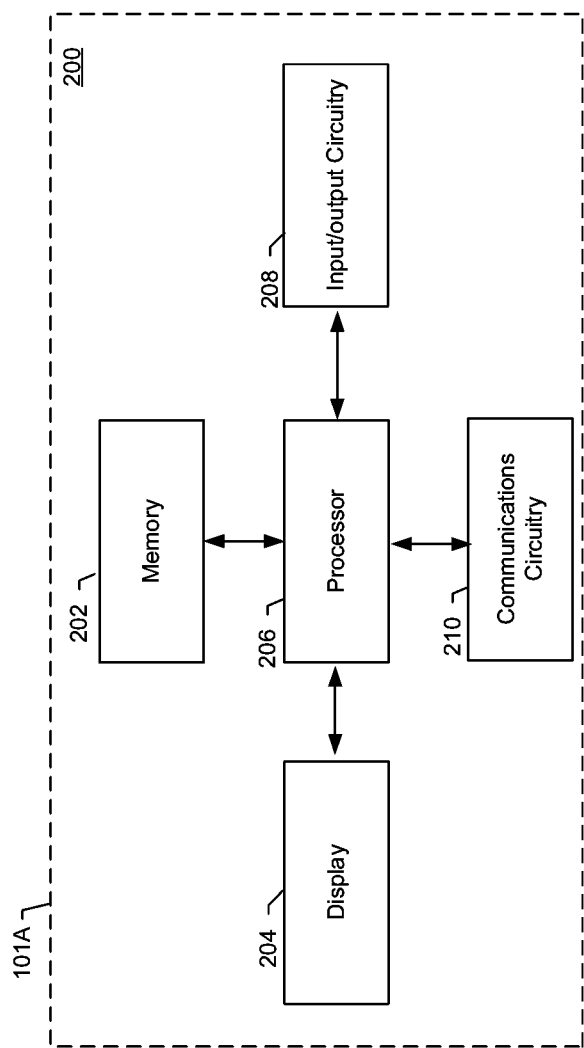
Figure 3:
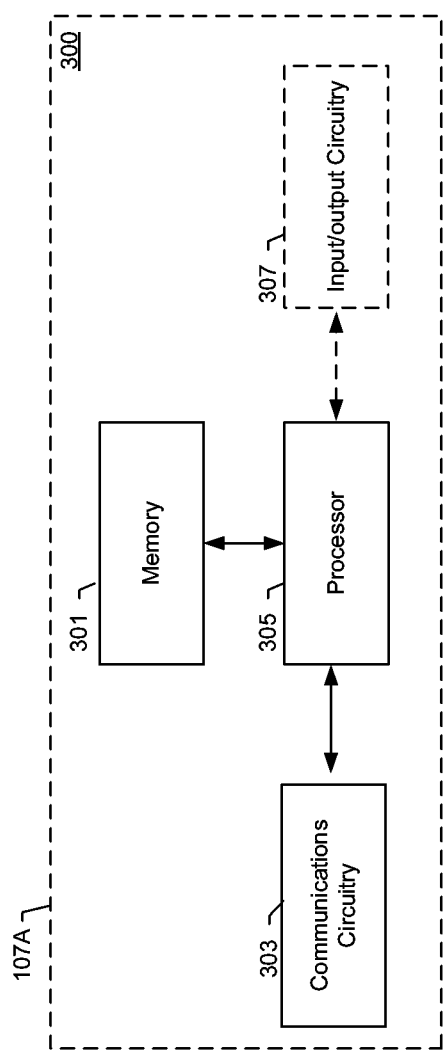
Figure 4A:
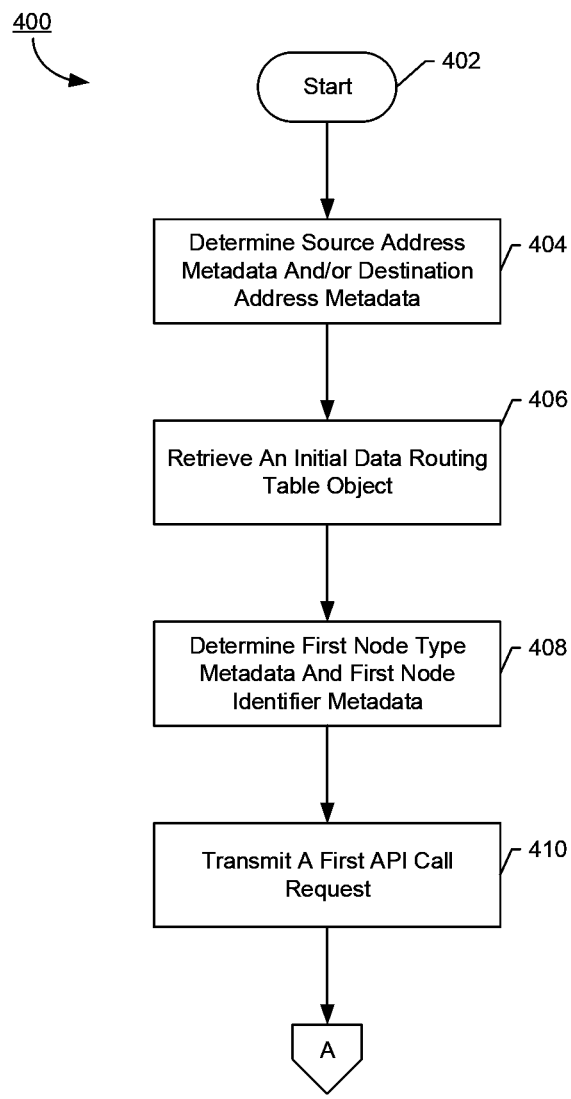
Figure 4B:
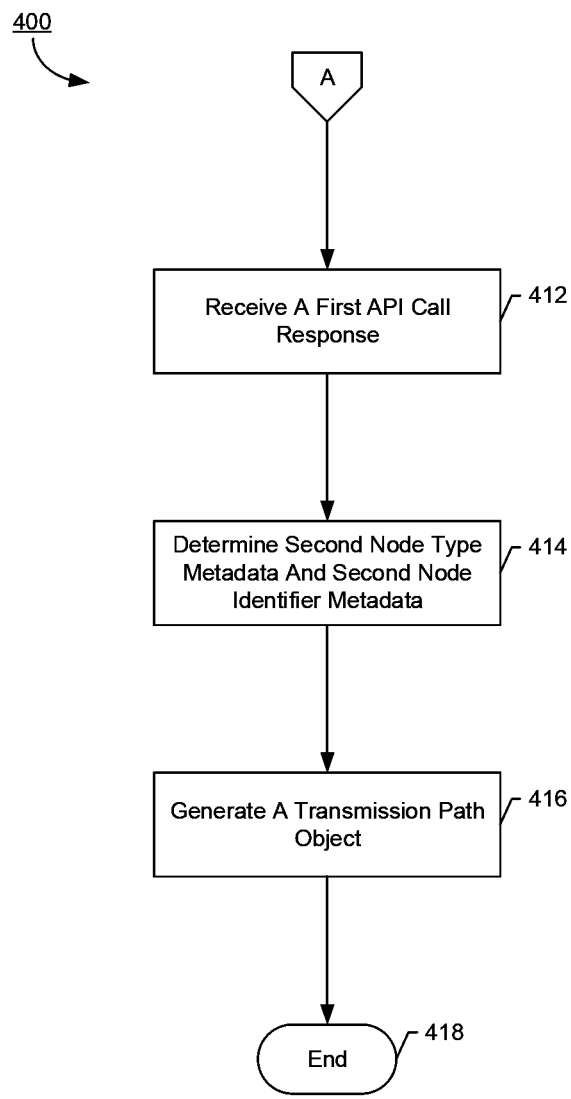
Figure 5:
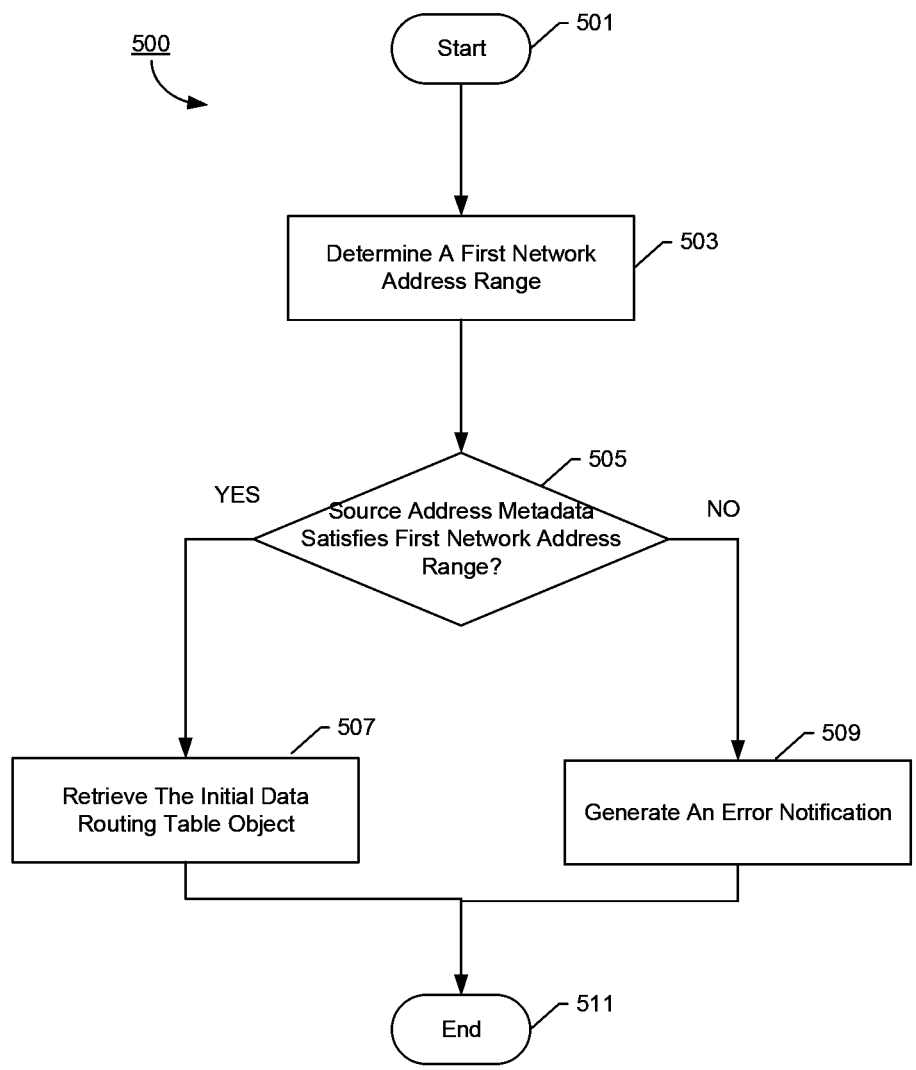
Figure 6:
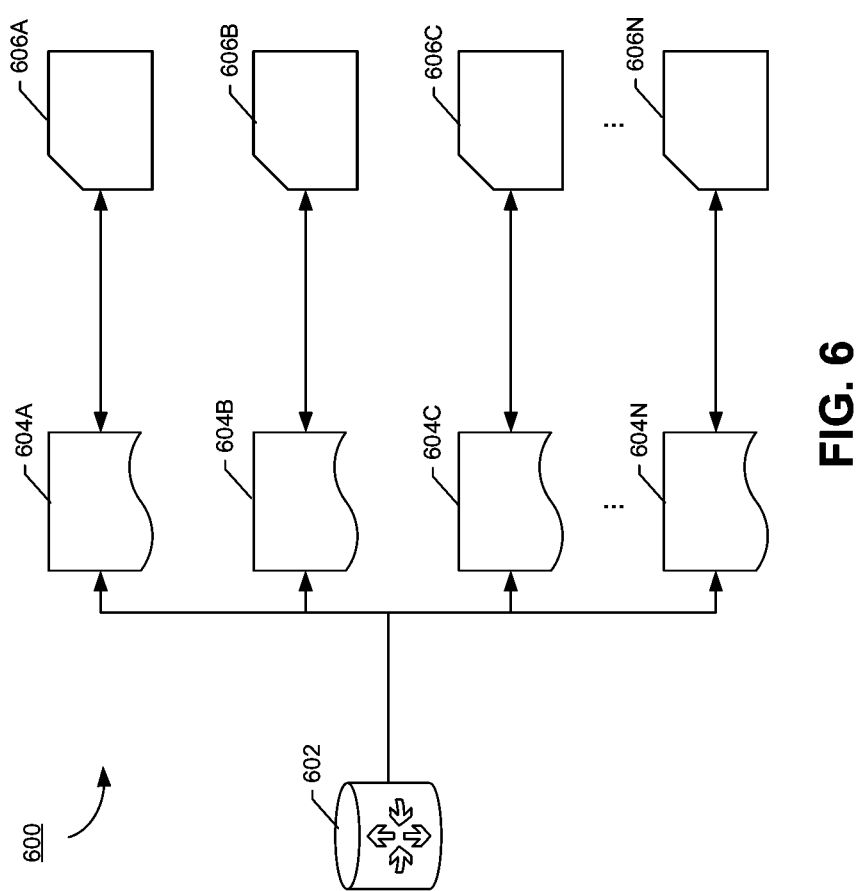
Figure 7:
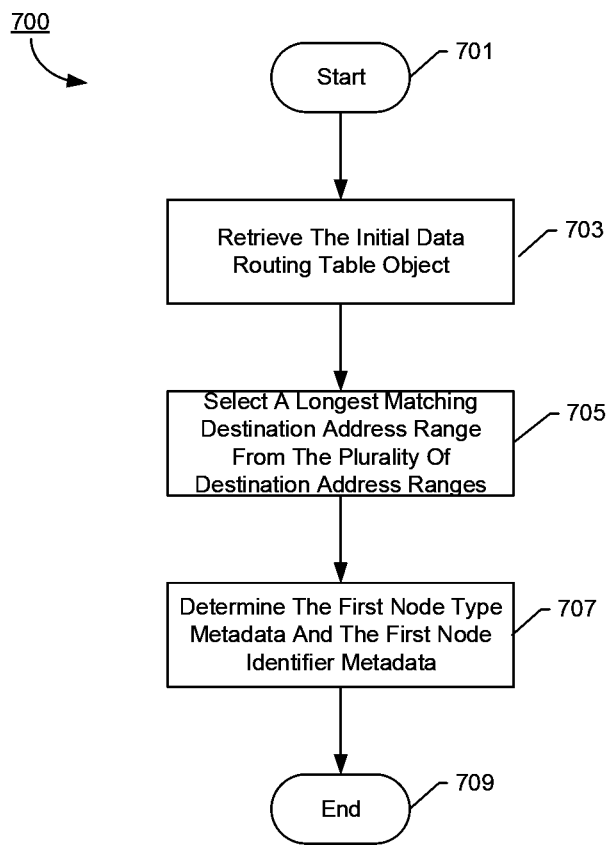
Figure 8:
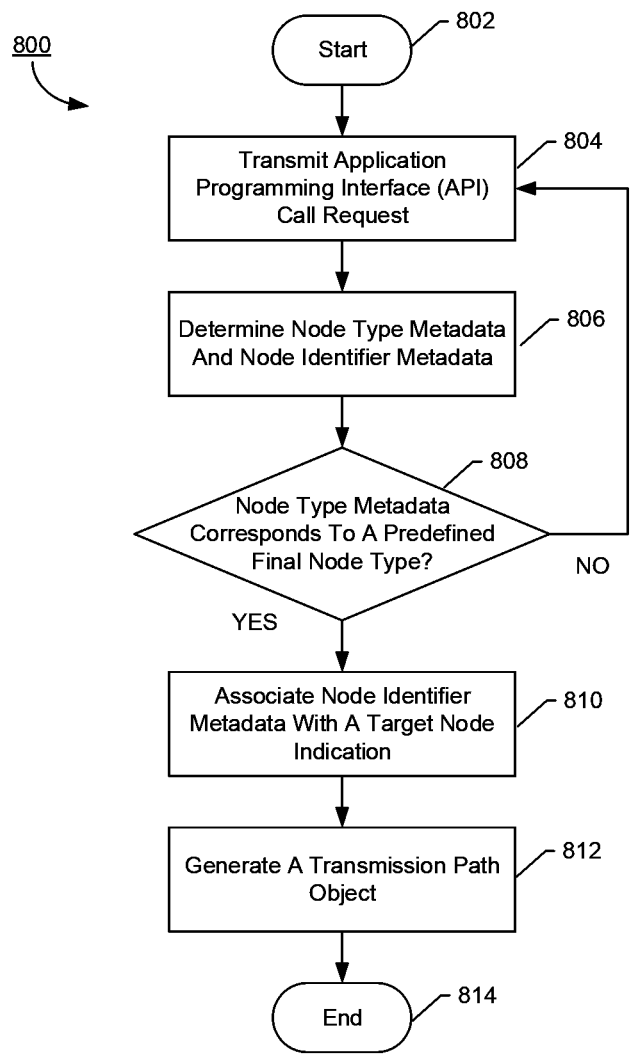
Figure 9:
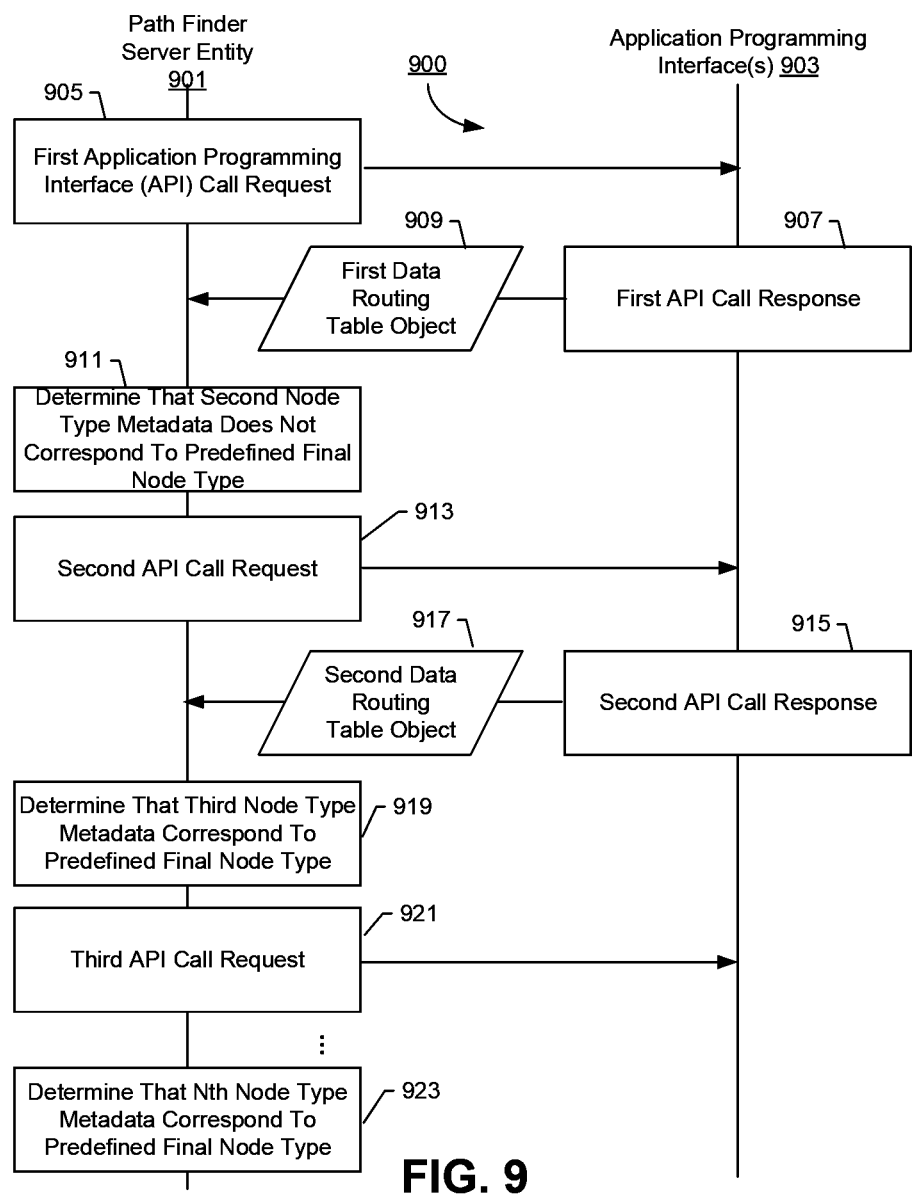
Figure 11:
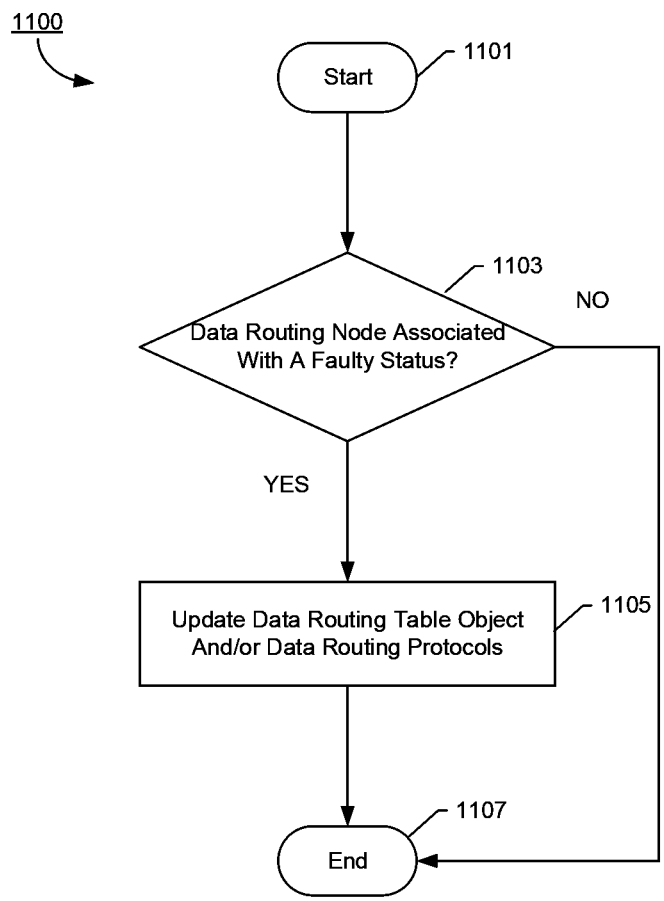
Figure 12A:
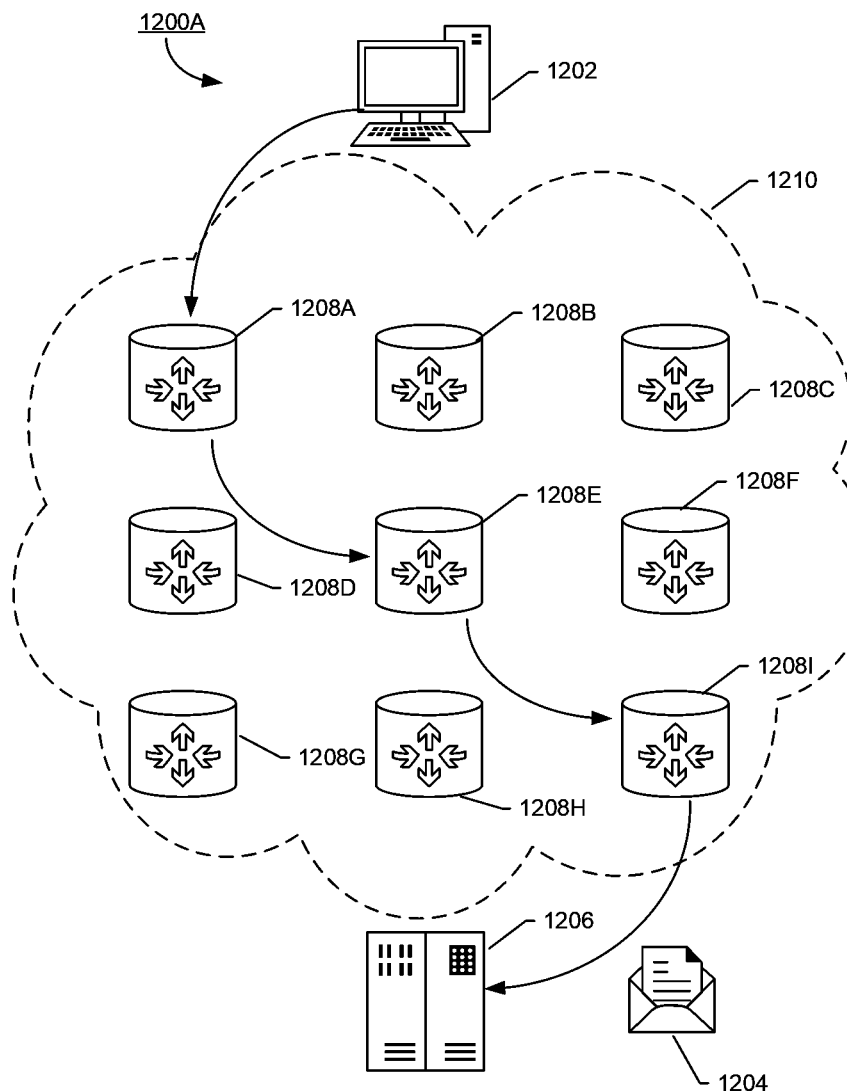
Figure 12B:
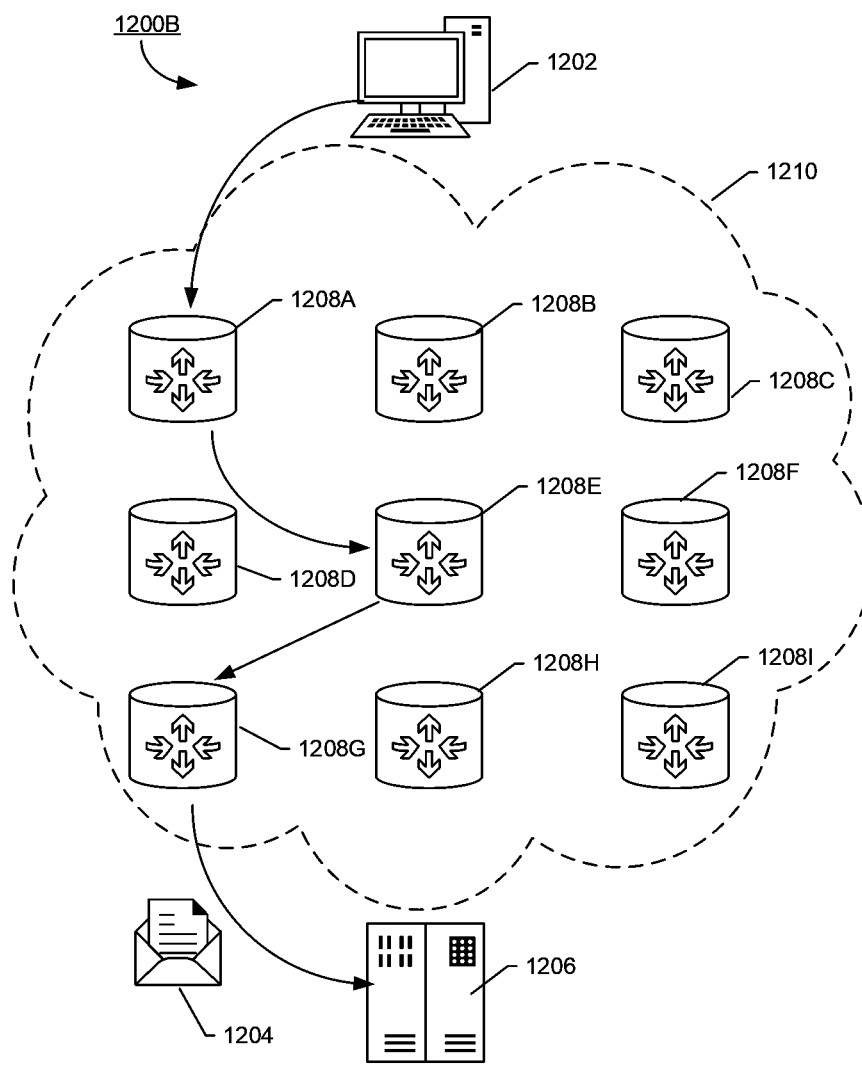

Having thus described some embodiments in general terms, references will now be made to the accompanying drawings, which are not necessarily drawn to scale, and wherein:

FIG. 1 is an example system architecture diagram illustrating an example network service cloud in communication with other devices (such as client devices) in accordance with some embodiments of the present disclosure;

FIG. 2 is an example infrastructure diagram illustrating an example computing device (for example, an example client device) in accordance with some embodiments of the present disclosure;

FIG. 3 is an example infrastructure diagram illustrating an example computing device (for example, an example network service server) in accordance with some embodiments of the present disclosure;

FIG. 4A and FIG. 4B are example flowcharts illustrating an example method for generating a transmission path object in accordance with some embodiments of the present disclosure;

FIG. 5 is an example flowchart illustrating an example method for retrieving an initial data routing table object in accordance with some embodiments of the present disclosure;

FIG. 6 is an example diagram illustrating an example data routing node, its associated network address ranges, and its associated data routing table objects in accordance with some embodiments of the present disclosure;

FIG. 7 is an example flowchart illustrating an example method associated with determining node type metadata and node identifier metadata from a data routing table object in accordance with some embodiments of the present disclosure;

FIG. 8 is an example flowchart illustrating an example method associated with generating a transmission path object in accordance with some embodiments of the present disclosure;

FIG. 9 is an example signal diagram illustrating an example method associated with generating a transmission path object in accordance with some embodiments of the present disclosure;

FIG. 10A, FIG. 10B, FIG. 10C, and FIG. 10D are example diagrams illustrating example data object transmissions in accordance with some embodiments of the present disclosure;

FIG. 11 is an example flowchart illustrating an example method associated with diagnosing data object transmissions in accordance with some embodiments of the present disclosure; and FIG. 12A and FIG. 12B are example diagrams illustrating example data object transmissions in accordance with some embodiments of the present disclosure.

DETAILED DESCRIPTION OF VARIOUS EMBODIMENTS

Various embodiments of the present disclosure are described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

The term "comprising" means "including but not limited to," and should be interpreted in the manner it is typically used in the patent context. Use of broader terms such as "comprises," "includes," and "having" should be understood to provide support for narrower terms such as "consisting of," "consisting essentially of," and "comprised substantially of."

The phrases "in one embodiment," "according to one embodiment," "in some embodiments," "in some examples," "for example," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

Overview

Various embodiments of the present disclosure relate generally to tracking, tracing, and diagnosing data traffic in a network service cloud. For example, various embodiments of the present disclosure generate one or more transmission path objects that represent the transmission path(s) of one or more example data objects in an example network service cloud.

In an example network service cloud, system resources are interconnected with one another to handle one or more computing tasks such as, but not limited to, receiving data, calculating data, storing data, transmitting data, and/or the like. In some examples, one or more system resources in an example network service cloud may be in hardware forms such as, but not limited to, one or more central processing units (CPUs), one or more memory units (such as, but not limited to, random-access memories, hard disk drives), one or more servers, one or more relays, one or more routers, and/or the like. In some examples, one or more system resources in an example network service cloud may be in software forms, such as, but not limited to, one or more embedded software (such as, but not limited to, firmware), one or more web applications (such as, but not limited to, one or more application software that run on a server), and/or the like. In some embodiments, one or more system resources in an example network service cloud may be in the form of one or more computer networks. In some embodiments, one or more system resources in an example network service cloud may be in other forms.

When a data packet is transmitted to an example network service cloud from a computing device (for example, from a client device), the example network service cloud may select one or more routing paths for the data packet through which the data packet can reach its destination (for example, another computing device within or outside of the example network service cloud). The routing path(s) may be described based on one or more data routing nodes in the example network service cloud that transmit and/or receive the data packet. For example, the data packet may be first transmitted to a first data routing node, and then transmitted from the first data routing node to a second data routing node. This process may be iterated, and the data packet can be transmitted to/from different data routing nodes until the data packet reaches its destination device.

Identifying the routing path(s) of a data packet in an example network service cloud provides provide many technical benefits. For example, when a data packet failed to arrive at its destination device, identifying the routing path(s) of this data packet may assist an end user to diagnose and/or troubleshoot network problem(s) associated with the example network service cloud. As another example, when a data routing node is carrying more data than it can handle (for example, when the data routing node is in a faulty status), a network congestion may occur, which may cause packet loss, queueing delays, and/or unstable data transmission. In such an example, identifying the routing path(s) of a data packet may allow an end user and/or the example network service cloud to avoid utilizing the data routing node with the faulty status to transmit and/or receive data packets, and therefore avoid packet loss, queueing delays, and unstable data transmission.

However, many methods and systems associated with identifying the routing path(s) of a data packet are plagued by technical problems and difficulties. For example, some methods and systems may utilize commands such as traceroute or mtr to identify a routing path from a source device to a destination device. These commands are based on the time-to-live (TTL) value of a data packet, which limits the numbers of data routing nodes that a data packet may be received by and/or transmitted to. For example, the traceroute command may create and send a first data packet with a TTL value of 1 from a source device (for example, a client device). When the first data routing node receives the first data packet, it reduces the TTL value by 1 (which is now 0), drops the first data packet, and sends a first "time exceeded" message back to the source device. The traceroute command records the Internet Protocol (IP) address associated with the first data routing node based on the first "time exceeded" message, and then sends a second data packet with a TTL value of 2. The second data packet is transmitted to the first data routing node (which reduces the TTL value by 1) and then transmitted from the first data routing node to a second data routing node. When the second data routing node receives the second data packet, it reduces the TTL value by 1 (which is now 0), drops the second data packet, and sends a second "time exceeded" message back to the source device. The traceroute command records the IP address associated with the second data routing node based on the second "time exceeded" message. This process may be iterated until the source device receives a "time exceeded" message from the destination device.

There are many technical limitations and restrictions when implementing commands such as traceroute or mtr in an example network service cloud. For example, many data routing nodes (such as, but not limited to, a Virtual Private Network (VPC) peering connection, Amazon Web Services (AWS) Transit Gateway) may not provide a "time exceeded" message back to the source device when the TTL value reaches 0. In such an example, commands such as traceroute or mtr may fail to identify all the data routing nodes of a routing path in an example network service cloud.

As another example, the source device needs to be authenticated by or logged into multiple system resources of the example network service cloud in order to carry out the traceroute or mtr command. In some examples, an organization may comprise different groups of users (such as developers), and each group of users within the organization may subscribe to various computer resources of the example network service cloud. In some embodiments, some system resources may be available to one group of users but not to another group of users. For example, a user Adam may have access to system resource Service A from the example network service cloud, while another user John may not have access to Service A. If John needs to identify the routing path of a data package generated and transmitted to the example network service cloud from a source device associated with Adam, John needs to obtain Adam's login credentials to Service A, which may compromise data security and may be prohibited by the organization policies. In some embodiments, due to security reasons, a user may not be allowed to login to one or more services. As such, the traceroute or mtr command is not suitable for identifying the routing path in an example network service cloud.

In addition, the number of active login sessions of a particular system resource at a given point of time may be restricted, which creates technical challenges including, but not limited to, response latency when implementing traceroute or mtr. For example, a system source Service B may impose a limitation on the number of active login sessions from users within an organization Acme. When a user Teddy from Acme intends to implement the traceroute or mtr command, Teddy may need to wait until a login session becomes available, therefore causing unnecessary latencies in identifying the routing path of a data packet.

Further, an organization may subscribe to hundreds or thousands of system resources provided by an example network service cloud, and the number of system resources that the organization is subscribed to may be growing rapidly as data processing need of the organization grows. In such an example, logging into each of the hundreds or thousands of the system resources to carry out the traceroute command or the mtr command is not only cost prohibitive, but also impractical.

Example embodiments of the present disclosure may overcome the above-referenced technical challenges, limitations, and difficulties while providing various technical benefits. For example, various embodiments of the present disclosure may provide an API based approach to identify the routing path(s) of a data packet in an example network service cloud. Some example embodiments of the present disclosure may transmit one or more API call requests (as defined herein) to one or more APIs associated with an example network service cloud, and may receive one or more data routing table objects (as defined herein) as part of one or more API call responses (as defined herein). Based on the one or more data routing table objects, some examples of the present disclosure may determine the type and identifier of a next data routing node that is part of the routing path, may retrieve a data routing table object based at least in part on the type and/or the identifier of the next data routing node, and may identify the type and/or the identifier of a subsequent data routing node. In some embodiments, this process may be iterated until the type and/or the identifier of a data routing node corresponds to one of the predefined final node type and/or identifier. In some embodiments, a transmission path object may be generated that describes all data routing nodes and transmission paths representing a data object transmission associated with the data object in the network service cloud.

As such, example embodiments of the present disclosure overcome the login limitations associated with other methods (such as the traceroute and mtr commands), identify data routing nodes that other methods fail to identify (such as a VPC peering connection), and reduce system resource consumption and response latency through this API-based approach to identify data routing nodes and transmission paths in an example network service cloud. Various embodiments of the present disclosure may identify all route path information (even information that traceroute or mtr cannot identify) and hop information (including verbose information) around the network service cloud based on API(s) and without the need for an agent, details of which are described herein.

Definitions

As used herein, the terms "data," "content," "digital content," "digital content object," "information," and similar terms may be used interchangeably to refer to data capable of being transmitted, received, and/or stored in accordance with examples of the present disclosure. Thus, use of any such terms should not be taken to limit the spirit and scope of examples of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like (sometimes referred to herein as a "network"). Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "circuitry" should be understood broadly to include hardware and, in some examples, software for configuring the hardware. With respect to components of the apparatus, the term "circuitry" as used herein should therefore be understood to include particular hardware configured to perform the functions associated with the particular circuitry as described herein. For example, in some examples, "circuitry" may include processing circuitry, storage media, network interfaces, input/output devices, and the like.

The terms "set" or "subset" refer to a collection of zero or more elements.

In the present disclosure, the term "data object" refers to a data structure that represents one or more functionalities and/or characteristics associated with data and/or information. In some embodiments, a data object may be associated with one or more software (for example, one or more computer programs) and/or one or more hardware (for example, one or more servers and/or one or more client devices). For example, a data object may provide a functional unit for one or more computer programs. A user who operates a client device that is executing the one or more computer programs may provide user input associated with the data object, and the user input may comprise an electronic selection of a data object, an electronic request to modify, manipulate, change a data object, and/or the like.

In some embodiments, a data object may also be referred to as a data packet. In the present disclosure, the term "data packet" refers to a data object in the form of an unit of data/information that may be transmitted to, received from, and/or traveled through a computer network (such as, but not limited to, a network service cloud as defined herein). For example, a data packet may comprise a formatted unit of one or more metadata (as defined herein), and may be transmitted in a network service cloud that comprises data routing nodes (as defined herein).

As described above, a data packet or data object may comprise one or more metadata. In the present disclosure, the term "metadata" refers to a parameter, a data field, or the like, that describes an attribute of a data element, such as a data object or data packet. In some examples, the data packet may be formatted based on one or more data formatting protocols. For example, a data packet may comprise metadata such as, but not limited to, control metadata, user metadata, and/or the like, that are formatted based on the one or more data formatting protocols.

In some embodiments, example user metadata may include data/information that is intended to be transmitted to, received from, and/or traveled through an example network service cloud. Such data/information includes, but not limited to, a payload message. In some embodiments, the user metadata associated with a data packet may be stored in a body portion of the data packet based on the one or more data formatting protocols. In some embodiments, the user metadata may be in the form of text string(s), numerical character(s), alphabetical character(s), alphanumeric code(s), ASCII character(s), and/or the like.

In some examples, example control metadata may include data/information that may define, direct, and/or control the transmission of a data package in a network service cloud. Example control metadata may include, but not limited to, source address metadata, destination address metadata, and/or the like. In some embodiments, the source address metadata defines a source address (for example, an IP address) associated with a source device (from which a data packet is transmitted). In some embodiments, the destination address metadata defines a destination address (for example, an IP address) associated with a destination device (to which a data packet is transmitted, either within a network service cloud or outside a network service cloud). In some embodiments, the control metadata associated with a data packet may be stored in a header portion of the data packet based on the one or more data formatting protocols. In some embodiments, the control metadata may be in the form of text string(s), numerical character(s), alphabetical character(s), alphanumeric code(s), ASCII character(s), and/or the like.

In the present disclosure, the terms "network service cloud" or "network service system" refer to a software platform and associated hardware that are configured to support and maintain various data services and/or data exchanges among various devices. Examples of data services that are supported and/or maintained by a network service cloud may include, but not limited to, data computing, data management, data monitoring, data storage, data migration, data development, data analytics, data deployment, and/or the like. In some embodiments, a network service cloud may comprise a plurality of system resources (as described above) to provide such data services and/or data exchanges.

In some embodiments, a network service cloud may comprise a plurality of data routing nodes that are interconnected through wired or wireless means. The term "data routing node" refers to one or more hardware components and/or corresponding software components that guide, direct, support and/or maintain data object transmission in a network service cloud. For example, a data routing node may receive data/information (such as a data packet) from one or more other data routing nodes, from one or more other devices (such as client devices), and/or the like. Additionally, or alternatively, a data routing node may transmit data/information (such as a data packet) to one or more other data routing nodes, to one or more other devices (such as client devices), and/or the like.

In some embodiments, an example data routing node is a software data routing node. In such embodiments, the software data routing includes computer programming instructions that are stored in a non-transitory computer storage media such that, when the computer programming instructions are executed by a processing unit (such as a processor), the computer programming instructions cause the processing unit to receive and/or transmit data objects such as data packets.

In some embodiments, an example data routing node is a hardware data routing node. In such embodiments, the hardware data routing node is an electronic device that is attached, connected to and/or deployed within the network service cloud, and is capable of receiving and/or transmitting data objects such as data packets. For example, an example hardware data routing node may be in the form of a gateway. As another example, an example hardware data routing node may be in the form of a network switch. As another example, an example hardware data routing node may be in the form of a router. Additionally, or alternatively, an example hardware data routing node may be in other form(s).

In some embodiments, an example data routing node may comprise both one or more software elements from a software data routing node and one or more hardware elements from a hardware data routing node.

In some embodiments, a network service cloud may provide sufficient data security through its framework, structure, and/or data exchange channels, such that the one or more client devices may interact with and/or exchange data/information through one or more data routing nodes in the network service cloud.

In some embodiments, an example data routing node may be associated with one or more metadata. As described above, the term "metadata" refers to a parameter, a data field, or the like, that describes an attribute of a data element, such as a data routing node. Example metadata associated with a data routing node may include, but not limited to, node type metadata, node identifier metadata, node address metadata, and/or the like.

In the present disclosure, the term "node type metadata" refers to data/information that indicates a type or category associated with a data routing node. In some embodiments, the node type metadata may be in the form of text string(s), numerical character(s), alphabetical character(s), alphanumeric code(s), ASCII character(s), and/or the like.

For example, example node type metadata may indicate that an example data routing node is a Network Address Translation Gateway ("NatGateway"). Additionally, or alternatively, example node type metadata may indicate that an example data routing node is an Internet Gateway ("IGW"). Additionally, or alternatively, example node type metadata may indicate that an example data routing node is associated with a Virtual Private Cloud Peering ("VPC Peering") connection. Additionally, or alternatively, example node type metadata may indicate that an example data routing node is a Virtual Gateway ("VGW"). Additionally, or alternatively, example node type metadata may indicate that an example data routing node is a local gateway ("Local"). Additionally, or alternatively, example node type metadata may indicate that an example data routing node is a Transit Gateway ("TGW"). Additionally, or alternatively, example node type metadata may indicate that an example data routing node is a Virtual Network Interface ("VIF"). Additionally, or alternatively, example node type metadata may indicate that an example data routing node is a Customer Gateway ("CGW"). Additionally, or alternatively, example node type metadata may indicate that an example data routing node is of another type and/or associated with other types.

The term "node identifier metadata" refers to data/information that uniquely identifies a data routing node from other data routing nodes in the network service cloud (for example, from other data routing nodes of the same type or from all other data routing nodes including different type(s)). In some embodiments, the node identifier metadata may be in the form of text string(s), numerical character(s), alphabetical character(s), alphanumeric code(s), ASCII character(s), and/or the like.

The term "node address metadata" refers to data/information that indicates an address associated with the data routing node. In some embodiments, the node address metadata may be in the form of text string(s), numerical character(s), alphabetical character(s), alphanumeric code(s), ASCII character(s), and/or the like.

In some embodiments, the node address metadata may indicate an IP address of the data routing node. For example, the node address metadata may indicate a public IP address. Additionally, or alternatively, the node address metadata may indicate a private IP address. Additionally, or alternatively, the node address metadata may indicate a static IP address. Additionally, or alternatively, the node address metadata may indicate a dynamic IP address. Additionally, or alternatively, the node address metadata may indicate an address in a network that is based on one or more network address protocols, including, but not limited to, Internet Protocol version 4 (IPv4), Internet Protocol version 6 (IPv6), and/or the like.

In some embodiments, one or more metadata associated with an example data routing node may be stored within the data routing node and/or may be stored external to the data routing node. For example, one or more metadata associated with an example data routing node may be stored in a data routing table object, as defined herein.

In some embodiments, an example network service cloud may provide one or more "Application Programming Interfaces" or "APIs." The terms "Application Programming Interface" or "API" refer to a software programming interface that specifies or defines communications and/or interactions (for example, between a server and a network service cloud, between a client device and a network service cloud, and/or the like), and/or the data format of one or more data requests, data responses, and/or the like.

For example, an "Application Programming Interface call request" or "API call request" may be transmitted from a client device, a server (for example, a network service server described herein), a computing entity (for example, a path finder server entity described herein), and/or the like to an API. The term "Application Programming Interface call request" or "API call request" refers to a software request to obtain data/information associated with a data element, such as a data routing node in a network service cloud.

Additionally, or alternatively, an "Application Programming Interface call response" or "API call response" may be received by a client device, a server (for example, a network service server described herein), a computing entity (for example, a path finder server entity described herein), and/or the like from an API. The term "Application Programming Interface call response" or "API call response" refers to a software response that provides data/information associated with a data element, such as a data routing node in a network service cloud.

For example, an example API call request may be transmitted to an example API from an example path finder server entity, and may indicate an electronic request to obtain a data routing table object associated with a data routing node in the network service cloud. In response, the example API may provide an example API call response to the example path finder server entity, and the example API call response comprises the data routing object associated with the data routing node. Additional details are described herein.

In some embodiments, one or more APIs may be associated with an example network service cloud. For example, the example network service cloud may be associated with a plurality of APIs that provide routing information associated with different types of data routing nodes in the example network service cloud. Example APIs associated with an example network service cloud may include, but not limited to, "DescribeVPC," "DescribeRouteTables," "DescribeGateway," and/or the like.

The terms "data routing table object" or "routing table" refers to a data structure that defines one or more network targets (for example, one or more data routing nodes) for transmitting data objects (such as data packets). In some embodiments, a data routing table object is associated with a data routing node and specifies a transmission path from the data routing node to the one or more network targets.

In some embodiments, a data routing table object may define one or more data routing protocols. The terms "data routing protocol" or "data routing protocol set" refer to one or more rules on data object transmission that specify transmission paths within and between various data routing nodes. For example, an example data routing protocol of an example data routing table object may specify transmitting data objects (that a data routing node received) to one or more other data routing nodes in a network service cloud based on the destination address metadata corresponding to the data objects. As such, an example data routing protocol defines one or more transmission routes between and among data routing nodes, and each transmission route may provide a pathway for transmitting a data object (such as a data packet).

In some embodiments, the term "network address range" refers to a range of network addresses associated with a data routing node. For example, the network address range may define network addresses from where that a data routing node may receive a data object (such as a data packet). In some embodiments, each of the network address ranges may be associated with a corresponding data routing table object, details of which are described herein.

In some embodiments, a network address range may be specified or defined by at least one network address allocation protocol associated with a data routing node and/or the network service cloud. The term "network address allocation protocol" refers to one or more rules that partition available network addresses into a plurality of network address ranges that are distributed among data routing nodes. In some embodiments, the network address allocation protocol may be defined by, for example but not limited to, a network service cloud, a path finder server entity, and/or the like.

In the present disclosure, the terms "data object transmission" or "data transmission" refer to the transmission of a data object (such as a data packet) in a network service cloud. As described above, the data object may be transmitted from a source address (for example, represented in a source address metadata) to a destination address (for example, represented in a destination address metadata) during a data object transmission. In various embodiments of the present disclosure, a transmission path object may be generated based on and/or according to a data object transmission. The term "transmission path object" refers to a data structure that describes, indicates, and/or specifies one or more transmission paths of a data object among a plurality of data routing nodes in a network service cloud. Additional details of generating a transmission path object are described herein.

Example System Architecture for Implementing Embodiments of the Present Disclosure Methods, apparatuses, and computer program products of the present disclosure may be embodied by any of a variety of devices. For example, the method, apparatus, and computer program product of an example embodiment may be embodied by a networked device (e.g., a network service server and/or a client device) configured to communicate with one or more devices. Additionally, or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable (such as a smart watch), or any combination of the aforementioned devices.

While various embodiments of the present disclosure may be implemented in the Amazon Web Services (AWS) ecosystem, it is noted that the scope of the present disclosure is not limited to this implementation only. For example, various embodiments of the present disclosure may additionally or alternatively be implemented in other computer network(s).

FIG. 1 illustrates an example data object transmission environment 100 within which embodiments of the present disclosure may operate. In the example shown in FIG. 1, the data object transmission environment 100 may comprise a network service cloud 109 in electronic communication with one or more client devices 101A, 101B, 101C, . . . 101N (for example, via a communication network). In some embodiments, users may access the network service cloud 109 via the communication network using client devices 101A, 101B, . . . 101N.

In some embodiments, the client devices 101A-101N may be a computing device as described herein, including, but not limited to, desktop computers, laptop computers, smartphones, netbooks, tablet computers, wearables (e.g., a smart watch 101N as depicted in FIG. 1), and the like. In some embodiments, the client devices 101A-101N may interact with the network service cloud 109 via a web browser or through a web application that runs in a web browser. As yet another example, the client devices 101A-101N may include various hardware or firmware designed to interface with the network service cloud 109.

In some embodiments, the communication network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, the communication network may include an 802.11, 802.16, 802.20, and/or WiMax network. Further, the communication network may include a public network (such as the Internet), a private network (such as an intranet), or combinations thereof, and may utilize a variety of networking protocols including, but not limited to, TCP/IP based networking protocols. For instance, the networking protocol may be customized to suit the needs of the network service cloud 109 and/or the client devices 101A-101N. In some embodiments, the protocol is a custom protocol of JSON objects sent via a Web Socket channel. In some embodiments, the protocol is JSON over RPC, JSON over REST/HTTP, and the like.

In various embodiments of the present disclosure, electronic data received by the network service cloud 109 from the client devices 101A-101N may be provided in various forms and via various methods. For example, data and information (such as but not limited to, data objects) may be sent to the network service cloud 109 via, for example, the communication network directly by a client device of client devices 101A-101N. Additionally, or alternatively, these data and information (such as but not limited to, data objects) may be sent to network service cloud 109 via one or more intermediaries.

As described above, a network service cloud may comprise a plurality of system resources to provide data services and/or data exchanges. In the example shown in FIG. 1, the network service cloud 109 comprises a plurality of network service servers, such as, but not limited to, network service server 107A, network service server 107B, network service server 107C, network service server 107D, network service server 107E, network service server 107F, . . . , network service server 107N.

While the description above provides an example illustration of network service cloud, it is noted that the scope of the present disclosure is not limited to the description above. In some examples, the number of network service servers in an example network service cloud may be more or less than those shown in FIG. 1. In some examples, an example network service cloud may comprise one or more additional and/or alternative elements. For example, the network service cloud 109 may comprise a plurality of data routing nodes that are inter-connected with one another to guide, direct, support and/or maintain data object transmissions in the network service cloud 109. When the client device (such as one of the client devices 101A-101N) transmits a data packet to the network service cloud 109, the network service cloud 109 may route the data packet through one or more data routing nodes until the data packet reaches its final destination device.

In some embodiments, one or more of the plurality of network service servers 107A-107N are in electronic communication with one or more other network service servers 107A-107N. In some embodiments, one or more of the network service servers 107A-107N may correspond to an example path finder server entity (for example, the one or more of the network service servers 107A-107N may carry out operation(s) associated with the example path finder server entity). In such an embodiment, the example path finder server entity is embodied by one or more of network service servers 107A-107N. Additionally, or alternatively, an example path finder server entity may comprise one or more computing devices (such as servers) that are outside the network service cloud 109. Additionally, or alternatively, an example path finder server entity may be in the form of a server that is external to the network service cloud 109.

In some embodiments, the path finder server entity comprises software components and/or associated hardware components that are configured to generate one or more transmission path objects that are associated with data object transmissions in the network service cloud 109.

In some embodiments, the path finder server entity may receive an electronic request from a client device (for example, but not limited to, the client device 101A) to identify the transmission path associated with a data object that has been or will be transmitted in the network service cloud 109. In some embodiments, the path finder server entity may provide an API that allows the client device 101A to transmit the electronic request in the form of an API call request to the path finder server entity to identify the transmission path associated with a data object. For example, the path finder server entity may provide an API named "Pathfinder" to identify the transmission path(s) of a data object in the network service cloud 109. To invoke the Pathfinder API, the client device 101A provides an API call request that comprises data formatted based on the following structure:

pathfinder/{SourceIP}/{TargetIP}

In the above illustrated structure, a portion of the data in the API call request comprises {SourceIP}, which corresponds to the source address of the data object transmission (for example, according to the source address metadata of a data packet). A portion of the data in the API call request comprises {TargetIP}, which corresponds to the destination address of the data object transmission (for example, according to the destination address metadata of the data packet).

As an example, the client device 101A may provide the following example API call request to the path finder server entity, which is substantially in the form of a (Secure) Hypertext Transfer Protocol ("HTTP(S)") GET message based on the Python programming language and embodies a particular electronic request for identifying the transmission path associated with a data object:

import requests
import subprocess
env='prod'
audience='pathfinderservice'
token=subprocess.check_output('/usr/local/bin/atlas slauth token --
aud={ } -e { } --output=http'.format(audience, env), stderr=subprocess.
STDOUT, shell=True).decode( ).strip( )
base_url='https://pathfinderservice.us-east-1.prod.atl-paas.net'
url='{ }/pathfinder/10.1.128.0/10.116.160.0'.format(base_url)
headers={'Authorization': token}
r=requests.get(url, headers=headers)
print(r.content)
print('headers are: { }'.format(r.headers))

In the above example API call request, the client device 101A requests the path finder server entity to identify the transmission path for a data object that has the source address of 10.1.128.0 and the destination address of 10.116.160.0.

In some embodiments, in response to receiving an electronic request from the client device 101A to identify the transmission path(s) of a data object transmission associated with a data object (for example, in the form of an API call request described above), the path finder server entity may retrieve one or more data routing table objects through, for example but not limited to, transmitting one or more API call requests to one or more APIs associated with the network service cloud 109 and receiving one or more API call responses (that comprise one or more data routing table objects) from one or more APIs associated with the network service cloud 109. Based at least in part on the one or more data routing table objects, the path finder server entity identifies one or more data routing nodes associated with the data object transmission and/or generates a transmission path object representing the data object transmission, details of which are described herein.

It is noted that various components of the data object transmission environment 100 may leverage the same computer or computing apparatus to perform various operations. For example, various components of the network service servers 107A-107N in the network service cloud 109 may leverage the same computer or computing apparatus to perform various operations.

Example Apparatuses for Implementing Embodiments of the Present Disclosure

The client devices 101A, 101B, 101C, . . . , 101N of FIG. 1 may include one or more computing systems, such as the apparatus 200 shown in FIG. 2. The apparatus 200 may be configured to execute at least some of the operations described above with respect to FIG. 1 and below with respect to FIG. 4A to FIG. 12B. The apparatus 200 may include a processor 206, a memory 202, an input/output circuitry 208, a communications circuitry 210, and/or a display 204. The apparatus 200 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitries may both leverage use of the same processor, network interface, storage medium, or the like to perform their associated functions, such that duplicate hardware is not required for each set of circuitries. The use of the term "circuitry" as used herein with respect to components of the apparatus should therefore be understood to include particular hardware configured to perform the functions associated with the particular circuitry as described herein.

In some embodiments, the processor 206 (and/or co-processor or any other processing circuitry assisting or otherwise associated with the processor) may be in communication with the memory 202 via a bus for passing information among components of the apparatus. The memory 202 may be non-transitory and may include, for example, one or more volatile and/or non-volatile memories. In other words, for example, the memory 202 may be an electronic storage device (e.g., a computer readable storage medium). The memory 202 may be configured to store information, data, content, applications, instructions, or the like, for enabling the apparatus 200 to carry out various functions in accordance with example embodiments of the present disclosure.

The processor 206 may be embodied in a number of different ways and may, for example, include one or more processing devices configured to perform independently. Additionally, or alternatively, the processor 206 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 206 may be configured to execute instructions stored in the memory 202 or otherwise accessible to the processor. Alternatively, or additionally, the processor 206 may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor 206 is embodied as an executor of software instructions, the instructions may specifically configure the processor to perform the algorithms and/or operations described herein when the instructions are executed.

In some embodiments, the apparatus 200 may include the input/output circuitry 208 that may, in turn, be in communication with the processor 206 to provide output to the user and, in some embodiments, to receive an indication of a user input. The input/output circuitry 208 may comprise a user interface circuitry and may include a display, which may comprise a web user interface, a mobile application, a client device, a kiosk, or the like. In some embodiments, the input/output circuitry 208 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., the memory 202, and/or the like).

In some embodiments, the apparatus 200 may include the display 204 that may, in turn, be in communication with the processor 206 to display renderings of card data object rendering interfaces. In various examples of the present disclosure, the display 204 may include a liquid crystal display (LCD), a light-emitting diode (LED) display, a plasma (PDP) display, a quantum dot (QLED) display, and/or the like.

The communications circuitry 210 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 210 may include, for example, a network interface for enabling communications with a wired or wireless communication network. For example, the communications circuitry 210 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s).

The network service servers 107A, 107B, 107C, 107D, 107E, 107F, . . . , 107N of FIG. 1 may be embodied by one or more computing systems, such as apparatus 300 shown in FIG. 3. The apparatus 300 may include a processor 305, a memory 301, an input/output circuitry 307, and a communications circuitry 303. The apparatus 300 may be configured to execute the operations described above with respect to FIG. 1 and below with respect to FIG. 4A to FIG. 12B. Although these components 301, 303, 305, and 307 are described with respect to functional limitations, it should be understood that the particular implementations necessarily include the use of particular hardware. It should also be understood that certain of these components 301, 303, 305, and 307 may include similar or common hardware. For example, two sets of circuitries may both leverage use of the same processor, network interface, storage medium, or the like to perform their associated functions, such that duplicate hardware is not required for each set of circuitries.

In some embodiments, the processor 305 (and/or coprocessor or any other processing circuitry assisting or otherwise associated with the processor) may be in communication with the memory 301 via a bus for passing information among components of the apparatus. The memory 301 is non-transitory and may include, for example, one or more volatile and/or non-volatile memories. In other words, for example, the memory 301 may be an electronic storage device (e.g., a computer-readable storage medium). The memory 301 may be configured to store information, data, content, applications, instructions, or the like for enabling the apparatus to carry out various functions in accordance with example embodiments of the present disclosure.

The processor 305 may be embodied in a number of different ways and may, for example, include one or more processing devices configured to perform independently. In some examples, the processor 305 may include one or more processors configured in tandem via a bus to enable independent execution of instructions, pipelining, and/or multithreading. The use of the term "processor" or "processing circuitry" may be understood to include a single core processor, a multi-core processor, multiple processors internal to the apparatus, and/or remote or "cloud" processors.

In some examples, the processor 305 may be configured to execute instructions stored in the memory 301 or otherwise accessible to the processor 305. In some examples, the processor 305 may be configured to execute hard-coded functionalities. As such, whether configured by hardware or software methods, or by a combination thereof, the processor 305 may represent an entity (e.g., physically embodied in circuitry) capable of performing operations according to an embodiment of the present disclosure while configured accordingly. Alternatively, as another example, when the processor 305 is embodied as an executor of software instructions, the instructions may specifically configure the processor 305 to perform the algorithms and/or operations described herein when the instructions are executed.

In some embodiments, the apparatus 300 may include the input/output circuitry 307 that may, in turn, be in communication with the processor 305 to provide output to the user and, in some embodiments, to receive an indication of a user input. The input/output circuitry 307 may comprise a user interface circuitry and may include a display, which may comprise a web user interface, a mobile application, a client device, a kiosk, or the like. In some embodiments, the input/output circuitry 307 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., the memory 301, and/or the like).

The communications circuitry 303 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 303 may include, for example, a network interface for enabling communications with a wired or wireless communication network (such as the communication network described above in connection with FIG. 1). For example, the communications circuitry 303 may include one or more network interface cards, antennae, buses, switches, routers, modems, and supporting hardware and/or software, or any other device suitable for enabling communications via a network. Additionally, or alternatively, the communications circuitry 303 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

In some embodiments, other elements of the apparatus 300 may provide or supplement the functionality of particular circuitry. For example, the processor 305 may provide processing functionality, the memory 301 may provide storage functionality, the communications circuitry 303 may provide network interface functionality, and the like. As will be appreciated, any such computer program instructions and/or other type of code may be loaded onto a computer, processor or other programmable apparatus's circuitry to produce a machine, such that the computer, processor or other programmable circuitry that execute the code on the machine creates the means for implementing various functions, including those described herein.

Example Methods for Implementing Embodiments of the Present Disclosure

Various example methods described herein, including, for example, those as shown in FIG. 4A to FIG. 12B, may provide various technical advantages and/or improvements described above.

It is noted that each block of the flowchart, and combinations of blocks in the flowchart, may be implemented by various means such as hardware, firmware, circuitry and/or other devices associated with execution of software including one or more computer program instructions. For example, one or more of the methods described in FIG. 4A to FIG. 12B may be embodied by computer program instructions, which may be stored by at least one non-transitory memory of an apparatus employing an embodiment of the present disclosure and executed by at least one processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

Referring now to FIG. 4A and FIG. 4B, an example method 400 is illustrated. In particular, the example method 400 illustrates example steps/operations of generating a transmission path object in accordance with example embodiments of the present disclosure.

In the example shown in FIG. 4A, the example method 400 starts at block 402 and then proceeds to step/operation 404. At step/operation 404, a processing circuitry (such as a processing circuitry of a path finder server entity that includes, but not limited to, the processor 305 of the network service server 107A described above in connection with FIG. 1 and FIG. 3) may determine a source address metadata and/or a destination address metadata of a data object associated with a network service cloud.

As described above, the network service cloud may comprise a plurality of data routing nodes, which include hardware components and/or corresponding software components that guide, direct, support and/or maintain data object transmission in a network service cloud. An example data object (or data packet) may comprise a source address metadata defining a source address from which the data object (or data packet) is transmitted, and may comprise a destination address metadata defining a destination address to which the data object (or data packet) is transmitted.

As an example, a data object X may be transmitted from a device (such as the client device 101A described above in connection with FIG. 1) to a network service cloud (such as the network service cloud 109 described above in connection with FIG. 1). The data object X may comprise source address metadata defining the source address as 10.1.128.0. The data object X may comprise destination address metadata defining the destination address as 10.116.160.0.

As described above in connection with at least FIG. 1, the path finder server entity may provide an API (for example, a "Pathfinder API") that allows client devices 101A-101N to transmit one or more electronic requests (to the path finder server entity) in the form of one or more API call requests to identify the transmission path associated with a data object. In some embodiments, a processing circuitry (such as a processing circuitry of a path finder server entity that includes, but not limited to, the processor 305 of the network service server 107A described above in connection with FIG. 1 and FIG. 3) may determine the source address metadata and/or the destination address metadata associated with the data object in response to receiving an API call request.

Continuing from the above example, a device (such as the client device 101A described above in connection with FIG.

1) may invoke the Pathfinder API by transmitting the following API call request to the processing circuitry of the path finder server entity (such as, but not limited to, the processor 305 of the network service server 107A described above in connection with FIG. 1 and FIG. 3) to identify the transmission path(s) of data object X:

```
import requests
import subprocess
env='prod'
audience='pathfinderservice'
token=subprocess.check_output('/usr/local/bin/atlas slauth token --
    aud={ } -e { } --output=http'.format(audience, env),
stderr=subprocess.
    STDOUT, shell=True).decode( ).strip( )
    base_url='https://pathfinderservice.us-east-1.prod.atl-paas.net'
    url='{ }/pathfinder/10.1.128.0/10.116.160.0'.format(base_url)
    headers={'Authorization': token}
    r=requests.get(url, headers=headers)
    print(r.content)
    print('headers are: { }'.format(r.headers))
```

In the above example API call request, the client device 101A requests the path finder server entity to identify the transmission path(s) in the network service cloud for the data object X that has the source address of 10.1.128.0 and the destination address of 10.116.160.0.

Referring back to FIG. 4A, subsequent to step/operation 404, the method 400 proceeds to step/operation 406. At step/operation 406, a processing circuitry (such as a processing circuitry of a path finder server entity that includes, but not limited to, the processor 305 of the network service server 107A described above in connection with FIG. 1 and FIG. 3) may retrieve an initial data routing table object.

In some embodiments, the processing circuitry may retrieve the initial data routing table object based at least in part on the source address metadata. As described above, the network service cloud may define a plurality of network address ranges from which a data routing node may receive a data object. In some embodiments, each of the network address ranges may be associated with a corresponding data routing table object. In some embodiments, the processing circuitry determines that the source address metadata satisfies a network address range, and retrieves the data routing table object corresponding to the network address range as the initial data routing table object. Additional details associated with retrieving the initial data routing table object are described further in connection with at least FIG. 5 and FIG. 6.

Continuing from the above example, the processing circuitry may determine that the source address of 10.1.128.0 (which is associated with the data object X) satisfies a first network address range of the plurality of network address ranges, and may retrieve the data routing table object corresponding to the first network address range as the initial network address range.

Subsequent to step/operation 406, the method 400 proceeds to step/operation 408. At step/operation 408, a processing circuitry (such as a processing circuitry of a path finder server entity that includes, but not limited to, the processor 305 of the network service server 107A described above in connection with FIG. 1 and FIG. 3) may determine first node type metadata and first node identifier metadata associated with a first data routing node.

As described above, the initial data routing table object may define an initial data routing protocol set. For example, the initial data routing protocol set of the initial data routing table object may specify transmitting data objects (such as data packets) to one or more other data routing nodes in the network service cloud based on the corresponding destination address metadata associated with the data objects. In some embodiments, the processing circuitry may determine the first node type metadata and the first node identifier metadata based at least in part on the initial data routing protocol set. In some embodiments, the processing circuitry may determine the first node type metadata and the first node identifier metadata based on the initial data routing protocol set as well as the destination address metadata of the data object.

Continuing from the above example, an example initial data routing table object retrieved by the processing circuitry at step/operation 406 may provide the following initial data routing protocol set:

TABLE 1

EXAMPLE INITIAL DATA ROUTING PROTOCOL SET

| Destination Address Range | Target |
|---|---|
| 10.0.0.0/8 | tgw-0e4197391d77f7d4a |
| 172.31.0.0/16 | Local |

In some embodiments, the initial data routing protocol set may comprise a plurality of data routing protocols. Each data routing protocol comprises a destination address range field, as well as a target field (which corresponds to the destination address range field and comprises node type metadata and node identifier metadata that specify a data routing node). When the destination address metadata of a data object satisfies a destination address range in the destination address range field, the data routing protocol defines transmitting the data object to the data routing node specified by the corresponding node type metadata and the corresponding node identifier metadata in the corresponding target field. Additional details are described in connection with at least FIG. 7.

Continuing from the TABLE 1 example above, the destination address ranges of the initial data routing protocol set are provided in the form of Classless Inter-Domain Routing (CIDR) blocks, which can be translated into a range of network addresses. For example, the destination address range 10.0.0.0/8 can be translated into a range of network addresses from 10.0.0.0 to 10.255.255.255. As another example, the destination address range 172.31.0.0/16 can be translated into a range of network addresses from 172.31.0.0 to 172.31.255.255.

As described above, if the destination address metadata of a data object satisfies a destination address range (for example, a CIDR block) in the destination address range field of a data routing protocol, the data routing protocol defines transmitting the data object to the data routing node specified by the node type metadata and the node identifier metadata in the corresponding target field.

Continuing from the above example, the data object X may comprise destination address metadata defining the destination address as 10.116.160.0. Based on the example initial data routing protocol set provided above in connection with TABLE 1, the processing circuitry determines that the destination address of data object X satisfies the destination address range 10.0.0.0/8 in the first destination address range field. The processing circuitry determines that the first target field corresponding to the first destination address range field provides tgw-0e4197391d77f7d4a. In this example, the processing circuitry determines that the first node type metadata associated with the first data routing node is "tgw," which is a Transit Gateway. The processing circuitry also determines that the first node identifier metadata associated with the first data routing node is 0e4197391d77f7d4a. In this example, the transmission path(s) of the data object X in the network service cloud includes a first transmission path to a first data routing node that corresponds to the first node type metadata indicating a Transit Gateway and the first node identifier metadata indicating 0e4197391d77f7d4a.

Subsequent to step/operation 408, the method 400 proceeds to step/operation 410. At step/operation 410, a processing circuitry (such as a processing circuitry of a path finder server entity that includes, but not limited to, the processor 305 of the network service server 107A described above in connection with FIG. 1 and FIG. 3) may transmit a first API call request to a first API associated with the network service cloud.

In some embodiments, the first API call request comprises an electronic request for a first data routing table object associated with the first data routing node. In some embodiments, the first API call request is based at least in part on at least one of the first node type metadata or the first node identifier metadata determined at step/operation 408. For example, the first API call request may comprise the first node type metadata and/or the first node identifier metadata, and may describe an electronic request for a first data routing table object that is associated with the first data routing node. In some embodiments, the first API that the first API call is transmitted to may be determined based on the first node type metadata and/or the first node identifier metadata. For example, the processing circuitry may select an API (e.g. corresponding to the first data routing node) from a plurality of APIs associated with the network service cloud based on the first node type metadata and/or the first node identifier metadata, and may transmit the first API call request to the first API.

Continuing from the above example, the processing circuitry may transmit a first API call request to a first API (for example, an API that provides routing information associated with one or more data routing nodes, including the first data routing node) associated with the network service cloud for a first data routing table object corresponding to the first data routing node. In some examples, the first API call request may comprise the first node type metadata (e.g. indicating a Transit Gateway) corresponding to the first data routing node. In some examples, the first API call request may comprise the first node identifier metadata (e.g. 0e4197391d77f7d4a) corresponding to the first data routing node. In some embodiments, the first API may comprise both the first node type metadata and the first node identifier metadata. In some embodiments, the processing circuitry may select an API based on the first node type metadata and/or the first node identifier metadata.

Referring back to FIG. 4A, subsequent to step/operation 410, the method 400 proceeds to block A, which connected FIG. 4A to FIG. 4B. Referring now to FIG. 4B, subsequent to block A (e.g. subsequent to step/operation 410), the method 400 proceeds to step/operation 412. At step/operation 412, a processing circuitry (such as a processing circuitry of a path finder server entity that includes, but not limited to, the processor 305 of the network service server 107A described above in connection with FIG. 1 and FIG. 3) may receive a first API call response from the first API associated with the network service cloud.

In some embodiments, the first API call response comprises the first data routing table object. For example, in response to receiving the first API call request, the network service cloud may retrieve the first data routing table object based at least in part on the first node type metadata and/or the first node identifier metadata. Subsequently, the network service cloud may transmit the first data routing table object, and the processing circuitry (for example, a processing circuitry of a path finder server entity that includes, but not limited to, the processor 305 of the network service server 107A described above in connection with FIG. 1 and FIG. 3) may receive the first data routing table object.

Continuing from the above example, the processing circuitry may receive a first API call response from the first API associated with the network service cloud, and first API call response comprises the first data routing table object corresponding to the first data routing node. In some examples, the network service cloud may retrieve the first data routing table object corresponding to the first data routing node based on the first node type metadata (e.g. indicating a Transit Gateway). In some examples, the network service cloud may retrieve the first data routing table object corresponding to the first data routing node based on the first node identifier metadata (e.g. 0e4197391d77f7d4a). In some examples, the network service cloud may retrieve the first data routing table object corresponding to the first data routing node based on both the first node type metadata and the first node identifier metadata.

Referring back to FIG. 4B, subsequent to step/operation 412, the method 400 proceeds to step/operation 414. At step/operation 414, a processing circuitry (such as a processing circuitry of a path finder server entity that includes, but not limited to, the processor 305 of the network service server 107A described above in connection with FIG. 1 and FIG. 3) may determine second node type metadata and second node identifier metadata associated with a second data routing node.

In some embodiments, the processing circuitry determines the second node type metadata and the second node identifier metadata based at least in part on the destination address metadata and the first data routing table object. Similar to those described above in connection with at least step/operation 408 above, the first data routing table object may define a first data routing protocol set. For example, the first data routing protocol set of the first data routing table object may specify transmitting data objects (such as data packets) to one or more other data routing nodes in the network service cloud based on the corresponding destination address metadata associated with the data objects.

Continuing from the above example, an example first data routing table object that is received by the processing circuitry as part of the API call response at step/operation 412 may provide the following first data routing protocol set:

TABLE 2

EXAMPLE FIRST DATA ROUTING PROTOCOL SET

| Destination Address Range | Target |
|---|---|
| 10.0.0.0/8 | tgw-0713acf411db9dbd7 |
| 172.31.0.0/16 | Local |

Continuing from the above example, the data object X may comprise destination address metadata defining the destination address as 10.116.160.0. Based on the example first data routing protocol set provided above in connection with TABLE 2, the processing circuitry determines that the destination address of data object X satisfies the destination address range 10.0.0.0/8 in the first destination address range field. The processing circuitry determines that the first target field corresponding to the first destination address range field provides tgw-0713acf411db9dbd7. In this example, the processing circuitry determines that the second node type metadata associated with the second data routing node is "tgw," which is a Transit Gateway as described above. The processing circuitry also determines that the second node identifier metadata associated with the second data routing node is 0713acf411db9dbd7. In this example, the transmission path(s) of the data object X in the network service cloud includes a second transmission path from a first data routing node (that corresponds to the first node type metadata indicating a Transit Gateway and the first node identifier metadata indicating 0e4197391d77f7d4a) to a second data routing node (that corresponds to the second node type metadata indicating a Transit Gateway and the second node identifier metadata indicating 0713acf411db9dbd7).

Subsequent to step/operation 414, the method 400 proceeds to step/operation 416. At step/operation 416, a processing circuitry (such as a processing circuitry of a path finder server entity that includes, but not limited to, the processor 305 of the network service server 107A described above in connection with FIG. 1 and FIG. 3) generates a transmission path object representing the data object transmission.

In some embodiments, the processing circuitry generates the transmission path object based at least in part on the first node type metadata, the first node identifier metadata, the second node type metadata, and the second node identifier metadata. In some embodiments, the transmission path object defines at least a transmission path from the first data routing node to the second data routing node. For example, the transmission path object may specify that the data object is transmitted from a first data routing node (that corresponds to the first node type metadata and the first node identifier metadata) to a second data routing node (that corresponds to the second node type metadata and the second node identifier metadata).

Continuing from the example above, the processing circuitry may generate a transmission path object that represents the data object transmission of the data object X in the network service cloud. For example, the transmission path object defines a transmission path of the data object X in the network service cloud from the first data routing node (that corresponds to the first node type metadata indicating a Transit Gateway and the first node identifier metadata indicating 0e4197391d77f7d4a) to the second data routing node (that corresponds to the second node type metadata indicating a Transit Gateway and the second node identifier metadata indicating 0713acf411db9dbd7).

In some embodiments, prior to generating the transmission path object, various steps/operations described in FIG. 4A and FIG. 4B may be repeated or iterated until the processing circuitry determines that a final data routing node in the data object transmission has been identified. Additional details are described in connection with at least FIG. 8 and FIG. 9.

Referring back to FIG. 4B, subsequent to step/operation 416, the method 400 proceeds to block 418 and ends.

In some embodiments, the processing circuitry may carry out the method 400 described above in connect with FIG. 4A and FIG. 4B and/or other methods described herein prior to a data object is transmitted to/within the network service cloud. For example, based on the source address metadata and/or the destination address metadata of the data object, the processing circuitry may generate the transmission path object prior to the data object being transmitted to and/or within the network service cloud. In some embodiments, the processing circuitry may carry out the method 400 described above in connect with FIG. 4A and FIG. 4B and/or other methods described herein subsequent to a data object is transmitted to/within the network service cloud.

Referring now to FIG. 5, an example method 500 is illustrated. In particular, the example method 500 illustrates example steps/operations of retrieving an initial data routing table object in accordance with example embodiments of the present disclosure.

In the example shown in FIG. 5, the example method 500 starts at block 501 and then proceeds to step/operation 503. At step/operation 503, a processing circuitry (such as a processing circuitry of a path finder server entity that includes, but not limited to, the processor 305 of the network service server 107A described above in connection with FIG. 1 and FIG. 3) determines a first network address range.

As described above, the term "network address range" refers to a range of network addresses from which a data routing node may receive a data object (such as a data packet). In some embodiments, the network service cloud may provide one or more network address allocation protocols that are each associated with a data routing node and defines one or more network address ranges. In some embodiments, each network address range may represent a subdivision of available network addresses associated with the network service cloud.

As an example, an example network service cloud may provide example network address allocation protocols defining the following example network address ranges listed in TABLE 3. In this example, each network address range is a subdivision within available network addresses of the network service cloud.

TABLE 3

EXAMPLE NETWORK ADDRESS RANGES

Network Address Range 10.0.0.0/24
10.0.1.0/24
10.0.2.0/24

In the above example, the network address ranges are represented in the form of CIDR blocks, and each of the CIDR blocks can be translated into a range of network addresses. For example, the network address range 10.0.0.0/24 can be translated into a range of addresses from 10.0.0.0 to 10.0.0.255. As another example, the network address range 10.0.1.0/24 can be translated into a range of addresses from 10.0.1.0 to 10.0.1.255. As another example, the network address range 10.0.2.0/24 can be translated into a range of addresses from 10.0.2.0 to 10.0.2.255.

Referring back to FIG. 5, subsequent to step/operation 503, the method 500 proceeds to step/operation 505. At step/operation 505, a processing circuitry (such as a processing circuitry of a path finder server entity that includes, but not limited to, the processor 305 of the network service server 107A described above in connection with FIG. 1 and FIG. 3) may determine whether the source address metadata satisfies the first network address range associated with an initial data routing node of the plurality of data routing nodes.

In some embodiments, the processing circuitry may determine that the source address metadata satisfies the first network address range if the source address represented by the source address metadata falls within the first network address range. In some embodiments, the processing circuitry may determine that the source address metadata does not satisfy the first network address range if the source address represented by the source address metadata does not fall within the first network address range.

Continuing from the example above, if the network address range is 10.0.0.0/24, and the source address represented by the source address metadata is 10.0.0.68, the processing circuitry determines that the source address metadata satisfies the first network address range. If the network address range is 10.0.1.0/24, and the source address represented by the source address metadata is 10.0.0.68, the processing circuitry determines that the source address metadata does not satisfy the first network address range.

If, at step/operation 505, the processing circuitry determines that the source address metadata satisfies the first network address range, the method 500 proceeds to step/operation 507. At step/operation 507, a processing circuitry (such as a processing circuitry of a path finder server entity that includes, but not limited to, the processor 305 of the network service server 107A described above in connection with FIG. 1 and FIG. 3) may retrieve the initial data routing table object, similar to those described above in connection with at least step/operation 406 of FIG. 4A.

As described above, each of the network address ranges may be associated with a corresponding data routing table object. As such, in response to determining that the source address metadata satisfies the first network address range, the processing circuitry may retrieve the first data routing table object corresponding to the first network address range.

For example, referring now to FIG. 6, an example diagram 600 illustrating an example data routing node 602, its associated network address ranges 604A, 604B, 604C, . . . 604N, and its associated data routing table objects 606A, 606B, 606C, . . . 606N is provided.

In the example shown in FIG. 6, the example data routing node 602 is associated with network address ranges 604A, 604B, 604C, . . . 604N. For example, the network service cloud provides one or more network address allocation protocols that divide available network addresses of the example data routing node 602 into network address ranges 604A, 604B, 604C, . . . 604N. As an example, the following TABLE 4 provides examples of network address ranges 604A, 604B and 604C shown in FIG. 6:

TABLE 4

EXAMPLE NETWORK ADDRESS RANGES

| Reference Number | Network Address Range |
|---|---|
| 604A | 10.0.0.0/24 |
| 604B | 10.0.1.0/24 |
| 604C | 10.0.2.0/24 |

The example diagram 600 shown in FIG. 6 further illustrates the example correlative relationships between each of the network address ranges 604A, 604B, 604C, . . . 604N and one of the data routing table objects 606A, 606B, 606C, . . . 606N. For example, the data routing table object 606A corresponds to the network address range 604A, the data routing table object 606B corresponds to the network address range 604B, the data routing table object 606C corresponds to the network address range 604C, . . . the data routing table object 606N corresponds to the network address range 604N.

Continuing from the above example in connection with TABLE 3, the network address range 604A may be 10.0.0.0/24, which can be translated into a range of addresses from 10.0.0.0 to 10.0.0.255 as described above. When a source address (for example, 10.0.0.68) of a source address metadata satisfies the network address range 10.0.0.0/24, the processing circuitry retrieve the data routing table object 606A. As another example, the network address range 604B may be 10.0.1.0/24, which can be translated into a range of addresses from 10.0.1.0 to 10.0.1.255 as described above. When a source address (for example, 10.0.1.68) of a source address metadata satisfies the network address range 10.0.1.0/24, the processing circuitry retrieve the data routing table object 606B. As another example, the network address range 604C may be 10.0.2.0/24, which can be translated into a range of addresses from 10.0.2.0 to 10.0.2.255 as described above. When a source address (for example, 10.0.2.68) of a source address metadata satisfies the network address range 10.0.2.0/24, the processing circuitry retrieve the data routing table object 606C.

Referring back to FIG. 5, if, at step/operation 505, the processing circuitry determines that the source address metadata does not satisfy the first network address range, the method 500 proceeds to step/operation 509. At step/operation 509, a processing circuitry (such as a processing circuitry of a path finder server entity that includes, but not limited to, the processor 305 of the network service server 107A described above in connection with FIG. 1 and FIG. 3) may generate an error notification.

In some embodiments, the processing circuitry may transmit the error notification to a client device (for example, to the client device that transmitted an electronic request to the processing circuitry to identify the transmission path(s) of the data object). In some embodiments, the error notification may indicate that the transmission path is not within the network service cloud. For example, in response to determining that the source address metadata does not satisfy the first network address range, the processing circuitry (such as a processing circuitry of a path finder server entity that includes, but not limited to, the processor 305 of the network service server 107A described above in connection with FIG. 1 and FIG. 3) may generate an error notification, and transmit the error notification to one of the client devices 101A, 101B, . . . 101N. In some embodiments, the error notification may indicate that a Virtual Private Network of a network service cloud do not contain the source address metadata. In some embodiments, the error notification may indicate that the source address metadata is not valid.

In some embodiments, in response to determining that the source address metadata does not satisfy the first network address range, the processing circuitry may determine whether the source address metadata satisfies a second network address range associated with the same data routing node or an alternative data routing node of the plurality of data routing nodes. In some embodiments, step/operation 503 and step/operation 505 may be repeated or iterated for each available network address range associated with a data routing node or all data routing nodes until a network address range that satisfies the source address metadata is identified.

Referring now to FIG. 6, as an example, the processing circuitry may determine whether the source address satisfies the first network address range 604A. If the processing circuitry determines that the source address satisfies the first network address range 604A, the processing circuitry may retrieve the first data routing table object 606A. If the processing circuitry determines that the source address does not satisfy the first network address range 604A, the processing circuitry may determine whether the source address satisfies the second network address range 604B. If the processing circuitry determines that the source address satisfies the second network address range 604B, the processing circuitry may retrieve the second data routing table object 606B. If the processing circuitry determines that the source address does not satisfy the second network address range 604B, the processing circuitry may determine whether the source address satisfies the third network address range 604C. As such, the processing circuitry may compare the source address with each of the network address ranges associated with a data routing node (or all data routing nodes in the network service cloud) until a suitable network address range that satisfies the source address is identified. The processing circuitry may further retrieve the data routing table object corresponding to the suitable network address range.

Referring back to FIG. 5, subsequent to step/operation 507 or step/operation 509, the method 500 proceeds to block 511 and ends.

Referring now to FIG. 7, an example method 700 is illustrated. In particular, the example method 700 illustrates example steps/operations of determining node type metadata and node identifier metadata from a data routing table object in accordance with example embodiments of the present disclosure.

In the example shown in FIG. 7, the example method 700 starts at block 701 and then proceeds to step/operation 703. At step/operation 703, a processing circuitry (such as a processing circuitry of a path finder server entity that includes, but not limited to, the processor 305 of the network service server 107A described above in connection with FIG. 1 and FIG. 3) may retrieve the initial data routing table object.

In some embodiments, the processing circuitry may retrieve the initial data routing table object at step/operation 703 similar to those described above in connection with at least step/operation 406 of FIG. 4A and/or method 500 described above in connection with FIG. 5 and FIG. 6.

As described above, the initial data routing table object may comprise an initial data routing protocol set that defines a plurality of destination address ranges. For example, an example initial data routing table object retrieved by the processing circuitry at step/operation 703 may provide the following initial data routing protocol set:

TABLE 5

EXAMPLE INITIAL DATA ROUTING PROTOCOL SET

| Destination Address Range | Target |
|---|---|
| 198.36.0.0/18 | Local |
| 198.36.12.0/22 | tgw-0e4197391d77f7d4a |

Subsequent to step/operation 703, the method 700 proceeds to step/operation 705. At step/operation 705, a processing circuitry (such as a processing circuitry of a path finder server entity that includes, but not limited to, the processor 305 of the network service server 107A described above in connection with FIG. 1 and FIG. 3) may select a longest matching destination address range from the plurality of destination address ranges based at least in part on the source address metadata.

In some embodiments, the processing circuitry may select the longest matching destination address range when two or more of the plurality of destination address ranges comprise an overlapping destination address range. Continuing from the TABLE 5 example above, the destination address range 198.36.0.0/18 may be translated into an address range from 198.36.0.0 to 198.36.63.255. The destination address range 198.36.12.0/22 may be translated into an address range from 198.36.12.0 to 198.36.15.255. In this example, the two destination address ranges comprise an overlapping destination address range from 198.36.12.0 to 198.36.15.255.

In some embodiments, the destination address as indicated by the destination address metadata of a data object may fall within the overlapping destination address range. Continuing from the example above, if the destination address is 198.36.12.18, it falls within the overlapping destination address range from 198.36.12.0 to 198.36.15.255.

In some embodiments, in response to determining that two or more of the plurality of destination address ranges comprise an overlapping destination address range, and that the destination address falls within the overlapping destination address range, the processing circuitry may select the longest matching destination address range from the two or more of the plurality of destination address ranges. In some embodiments, the longest matching destination address range may correspond to the destination address range that has the highest prefix value among the two or more of the plurality of destination address ranges.

Continuing from the example above, the processing circuitry may determine that the destination address range 198.36.0.0/18 has a prefix value of 18 bits, and that the destination address range 198.36.12.0/22 has a prefix value of 22 bits. In this example, the processing circuitry selects the destination address range 198.36.12.0/22 as the longest matching destination address range.

While the description above provides an example of selecting a destination address range from the plurality of destination address ranges, it is noted that the scope of the present disclosure is not limited to the description above. In some examples, an example method of selecting the destination address range may be based on one or more other criterion or criteria. In some embodiments, a processing circuitry may select the destination address range based on a priority of logics. For example, the processing circuitry may determine whether there is a destination address range corresponding to a local route and, if so, select the destination address range corresponding to the local route. If there is no destination address range associated with a local route, the processing circuitry may select the longest matching destination address range. If there is no longest matching destination address range, the processing circuitry select a destination address range that corresponds to a static route (which takes priority over the propagated routes). If there is no static route, the processing circuitry select a destination address range corresponding to a propagated route.

As an example, the processing circuitry selects a destination address range corresponding to a Border Gateway Protocol (BGP) propagated route from an AWS Direct Connect connection. As another example, the processing circuitry selects a destination address range corresponding to a manually added static route for a Site-to-Site VPN connection. As another example, the processing circuitry selects a destination address range corresponding to a BGP propagated route from a Site-to-Site VPN connection. As another example, for a longest matching destination address range where each Site-to-Site VPN connection uses BGP, the processing circuitry compares the AS PATH and selects the prefix with the shortest AS PATH.

Referring back to FIG. 7, subsequent to step/operation 705, the method 700 proceeds to step/operation 707. At step/operation 707, a processing circuitry (such as a processing circuitry of a path finder server entity that includes, but not limited to, the processor 305 of the network service server 107A described above in connection with FIG. 1 and FIG. 3) may determine the first node type metadata and the first node identifier metadata based at least in part on the longest matching destination address range. For example, the processing circuitry may select the destination address range field that comprises the longest matching destination address range, and determines the corresponding target field. The processing circuitry may determine the first node type metadata and the first node identifier metadata from the target field.

Continuing from the example above, the processing circuitry determines that the longest matching destination address range is 198.36.12.0/22. The processing circuitry determines that the target field corresponding to the longest matching destination address range provides tgw-0e4197391d77f7d4a. In this example, the processing circuitry determines that the first node type metadata associated with the first data routing node is "tgw," which is a Transit Gateway. The processing circuitry also determines that the first node identifier metadata associated with the first data routing node is 0e4197391d77f7d4a. In this example, the transmission path(s) of the data object X in the network service cloud includes a first transmission path to a first data routing node that corresponds to the first node type metadata indicating a Transit Gateway and the first node identifier metadata indicating 0e4197391d77f7d4a.

Referring back to FIG. 7, subsequent to step/operation 707, the method 700 proceeds to block 709 and ends.

Referring now to FIG. 8, an example method 800 is illustrated. In particular, the example method 800 illustrates example steps/operations of generating a transmission path object in accordance with example embodiments of the present disclosure.

In the example shown in FIG. 8, the example method 800 starts at block 802 and then proceeds to step/operation 804. At step/operation 804, a processing circuitry (such as a processing circuitry of a path finder server entity that includes, but not limited to, the processor 305 of the network service server 107A described above in connection with FIG. 1 and FIG. 3) may transmit an API call request to an API associated with the network service cloud.

As described above in connection with at least step/operation 410 and step/operation 412 of FIG. 4A and FIG. 4B, the processing circuitry may transmit an API call that comprises an electronic request for a data routing table object associated with a data routing node. In response, the processing circuitry may receive an API call response from the API associated with the network service cloud, which comprises the data routing table object.

As an example, an example data routing table object that is received by the processing circuitry as part of the API call response may provide the following data routing protocol set:

TABLE 6

EXAMPLE DATA ROUTING PROTOCOL SET

| Destination Address Range | Target |
|---|---|
| 10.0.0.0/8 | tgw-0713acf411db9dbd7 |
| 172.31.0.0/16 | tgw-0e4197391d77f7d4a |

Referring back to FIG. 8, subsequent to step/operation 804, the method 800 proceeds to step/operation 806. At step/operation 806, a processing circuitry (such as a processing circuitry of a path finder server entity that includes, but not limited to, the processor 305 of the network service server 107A described above in connection with FIG. 1 and FIG. 3) may determine node type metadata and node identifier metadata.

As described above in connection with at least step/operation 414 of FIG. 4B and/or the example method 700 described above in connection with FIG. 7, the processing circuitry may determine the node type metadata and the node identifier metadata based at least in part on the destination address metadata of the data object and the data routing table object.

Continuing from the example above, if the destination address metadata defines the destination address as 10.116.160.0, the processing circuitry may determine that the destination address metadata satisfies the destination address range 10.0.0.0/8 in the data routing protocol set of the data routing table object provided in TABLE 6. The processing circuitry determines that the target field corresponding to the destination address range field provides tgw-0713acf411db9dbd7. In this example, the processing circuitry determines that the node type metadata associated with the data routing node is "tgw," which is a Transit Gateway as described above. The processing circuitry also determines that the node identifier metadata associated with the data routing node is 0713 acf411db9dbd7.

While the description above provides an example of determining the node type metadata and the node identifier metadata based at least in part on the data routing table object, it is noted that the scope of the present disclosure is not limited to the description above. In some examples, an example processing circuitry may determine metadata associated with the next data routing node based at least in part on the elastic network interface (ENI) of the network service cloud. In such an example, the elastic network interface is a logical component that provides address information associated with network traffic (for example, associated with data routing nodes).

Referring back to FIG. 8, subsequent to step/operation 806, the method 800 proceeds to step/operation 808. At step/operation 808, a processing circuitry (such as a processing circuitry of a path finder server entity that includes, but not limited to, the processor 305 of the network service server 107A described above in connection with FIG. 1 and FIG. 3) may determine whether the node type metadata (determined at step/operation 806) corresponds to a predefined final node type.

In some embodiments, the processing circuitry and/or the network service cloud may define a list of one or more predefined final node types that correspond to a final data routing node associated with data object transmissions in a network service cloud. For example, when the processing circuitry determines that the data object X is transmitted to a data routing node A that is associated with node type metadata corresponding to one of the predefined final node types on the list, the processing circuitry determines that the data object transmission of the data object X within the network service cloud is completed, and/or that the data routing node A is the latest data routing node within the network service cloud that the data object X is transmitted to.

For example, the processing circuitry may determine that the list of one or more predefined final node types comprise IGW, Local, VIF, and CGW. In such an example, if the processing circuitry determines that the node type metadata (for example, based on a data routing table object) indicates a node type of IGW, Local, VIF, or CGW, the processing circuitry determines that the node type metadata corresponds to a predefined final node type. If the processing circuitry determines that the node type metadata (determined at step/operation 806) does not indicate a node type of IGW, Local, VIF, or CGW, the processing circuitry determines that the node type metadata does not correspond to a predefined final node type.

Continuing from the above example, when the node type metadata indicates a node type of IGW, the processing circuitry determines that the data object will be transmitted out of the network service cloud. When the node type metadata indicates a node type of Local, the processing circuitry determines that the destination of the data object is inside a VPC. When the node type metadata indicates a node type of VIF, the processing circuitry determines that the data object will be transmitted to a consumer device (for example, one of the client devices described above) via Direct Connect. When the node type metadata indicates a node type of CGW, the processing circuitry determines that the data object will be transmitted to a consumer device (for example, one of the client devices described above) via VPN.

Additionally, or alternatively, the processing circuitry and/or the network service cloud may define a list of one or more predefined final node identifiers that correspond to a final data routing node associated with data object transmissions in a network service cloud. For example, when the processing circuitry determines that the data object X is transmitted to a data routing node A that is associated with node identifier metadata corresponding to one of the predefined final node identifiers on the list, the processing circuitry determines that the data object transmission of the data object X within the network service cloud is completed, and/or that the data routing node A is the latest data routing node within the network service cloud that the data object X is transmitted to.

Referring back to FIG. 8, if, at step/operation 808, the processing circuitry determines that the node type metadata does not correspond to a predefined final node type, the method 800 returns to step/operation 804.

As described above, a processing circuitry (such as a processing circuitry of a path finder server entity that includes, but not limited to, the processor 305 of the network service server 107A described above in connection with FIG. 1 and FIG. 3) may transmit an API call request to an API associated with the network service cloud at step/operation 804.

In some embodiments, the API is the same API as described above. In some embodiments, the API is different from the API described above. In some embodiments, the API call request comprises an electronic request for a data routing table object associated with a data routing node as specified by the node type metadata and/or the node identifier metadata. In response, the processing circuitry may receive an API call response from the API associated with the network service cloud, which comprises the data routing table object. Based on the data routing table object, the processing circuitry may determine another node type metadata and/or another node identifier metadata at step/operation 806, and may determine whether the other node type metadata corresponds to a predefined final node type (and/or whether the node identifier metadata corresponds to a predefined final node identifier) at step/operation 810.

As such, in various embodiments of the present disclosure, the processing circuitry may repeat or reiterate step/operation 804, step/operation 806 and step/operation 808 until the node type metadata corresponds to a predefined final node type (and/or the node identifier metadata corresponds to a predefined final node identifier). For example, with reference back to FIG. 4B, in response to determining that the second node type metadata (which is determined at step/operation 414) does not correspond to the predefined final node type, the processing circuitry transmits a second API call request to the same or a different API associated with the network service cloud based at least in part on the second node type metadata for a second data routing table object associated with the second data routing node, and, in response to receiving a second API call response comprising the second data routing table object, the processing circuitry determines third node type metadata and third node identifier metadata associated with a third data routing node based on the second data routing table object.

Referring now to FIG. 9, an example repeat/reiteration process is illustrated in the example signal diagram 900. In particular, the example signal diagram 900 illustrates example data communications between an example path finder server entity 901 and one or more example Application Programming Interface(s) (API(s)) 903.

In some embodiments, the example path finder server entity 901 is similar to the path finder server entity described above in connection with FIG. 1. In some embodiments, one or more example API(s) 903 is similar to those described above in connection with at least FIG. 4A to FIG. 8.

Referring back to FIG. 9, at step/operation 905, the example path finder server entity 901 may transmit a first API call request to one or more example API(s) 903, similar to those described above in connection with at least step/operation 410 of FIG. 4A and the example method 800 described above in connection with FIG. 8. For example, the first API call request may be based at least in part on first node type metadata or first node identifier metadata associated with a first data routing node.

At step/operation 907, one or more example API(s) 903 may transmit a first API call response to the example path finder server entity 901. In the example shown in FIG. 9, the first API call response comprises the first data routing table object 909.

At step/operation 911, the example path finder server entity 901 may determine second node type metadata and second node identifier metadata associated with a second data routing node based at least in part on the first data routing table object 909 and the destination address metadata associated with the data object, similar to those described above in connection with at least step/operation 414 of FIG. 4B, the example method 700 described above in connection with FIG. 7, and/or the example method 800 described above in connection with FIG. 8. The processing circuitry may further determine that the second node type metadata does not correspond to a predefined final node type, similar to the example method 800 described above in connection with FIG. 8.

At step/operation 913, the example path finder server entity 901 may transmit a second API call request to the one or more example API(s) 903 in response to determining that the second node type metadata does not correspond to predefined final node type, similar to those described above in connection with at least step/operation 410 of FIG. 4A and the example method 800 described above in connection with FIG. 8. For example, the second API call request may be based at least in part on second node type metadata or second node identifier metadata associated with a second data routing node.

In some embodiments, the example path finder server entity 901 may transmit the second API call request at step/operation 913 to the same one or more example API(s) described above in connection with step/operation 905. In some embodiments, the example path finder server entity 901 may transmit the second API call request at step/operation 913 to one or more different API(s) than those described above in connection with step/operation 905.

At step/operation 915, one or more example API(s) 903 may transmit a second API call response to the example path finder server entity 901. In the example shown in FIG. 9, the second API call response comprises the second data routing table object 917.

In some embodiments, the same one or more example API(s) described above in connection with step/operation 907 may transmit the second API call response to the example path finder server entity 901 at step/operation 915. In some embodiments, one or more different API(s) than those described above in connection with step/operation 907 may transmit the second API call response to the example path finder server entity 901 at step/operation 915.

At step/operation 919, the example path finder server entity 901 may determine third node type metadata and third node identifier metadata associated with a third data routing node based at least in part on the second data routing table object 917 and the destination address metadata associated with the data object, similar to those described above in connection with at least step/operation 414 of FIG. 4B, the example method 700 described above in connection with FIG. 7, and/or the example method 800 described above in connection with FIG. 8. The processing circuitry may further determine that the third node type metadata does not correspond to a predefined final node type, similar to the example method 800 described above in connection with FIG. 8.

At step/operation 921, the example path finder server entity 901 may transmit a third API call request to the one or more example API(s) 903, similar to those described above in connection with at least step/operation 410 of FIG. 4A and the example method 800 described above in connection with FIG. 8. For example, the third API call request may be based at least in part on third node type metadata or third node identifier metadata associated with a third data routing node.

As illustrated in FIG. 9, the path finder server entity 901 may continue transmitting API call requests to the one or more example API(s) 903 until the path finder server entity 901 determines that the nth node type metadata corresponds to the predefined final node type at step/operation 923.

Referring back to FIG. 8, if, at step/operation 808, the processing circuitry determines that the node type metadata corresponds to a predefined final node type, the method 800 proceeds to step/operation 810. At step/operation 810, a processing circuitry (such as a processing circuitry of a path finder server entity that includes, but not limited to, the processor 305 of the network service server 107A described above in connection with FIG. 1 and FIG. 3) may associate the node identifier metadata with a target node indication in response to determining that the node type metadata corresponds to the predefined final node type.

As described above, a predefined final node type indicates that the corresponding data routing node is a final data routing node associated with data object transmissions in a network service cloud. In some embodiments, when the processing circuitry determines that the node type metadata of a data routing node corresponds to a predefined final node type, the processing circuitry associate the node identifier metadata of the data routing node with a target node indication, and may stop the repeat/iteration process described above (e.g. forgo transmitting another API call request to the same or another API associated with the network service cloud based on the node type metadata or the node identifier metadata).

Subsequent to step/operation 810, the method 800 proceeds to step/operation 812. At step/operation 812, a processing circuitry (such as a processing circuitry of a path finder server entity that includes, but not limited to, the processor 305 of the network service server 107A described above in connection with FIG. 1 and FIG. 3) may generate a transmission path object.

In some embodiments, the processing circuitry may generate the transmission path object based at least in part on one or more node type metadata and/or node identifier metadata that the processing circuitry has determined in accordance with various methods described herein. For example, with reference to FIG. 9, the processing circuitry may generate the transmission path object that comprises at least metadata associated with a first data routing node (e.g. first node type metadata and/or first node identifier metadata), metadata associated with a second data routing node (e.g. second node type metadata and/or second node identifier metadata), and metadata associated with a third data routing node (e.g. third node type metadata and/or third node identifier metadata). In such an example, the transmission path object defines at least a first transmission path from the first data routing node to the second data routing node, as well as a second transmission path from the second data routing node to the third data routing node.

In some embodiments, the processing circuitry may generate the transmission path object in response to receiving an electronic request (for example, an API call request) from a client device to identify the transmission path associated with a data object. In some embodiments, the processing circuitry may provide the transmission path object as part of an electronic response (for example, an API call response). As an example, the processing circuitry may transmit the following JavaScript Object Notation (JSON) response that describes a transmission path object to the client device:

[
{
"account": 914515288968,
"nexthop_account": "914515288968",
"nexthop_asn": 65071,
"nexthop_id": "tgw-0e4197391d77f7d4a",
"nexthop_name": "tgw-dev-us-west-2",
"nexthop_propagated": "no",
"nexthop_region": "us-west-2",
"nexthop_status": "active",
"nexthop_type": "TGW",
"nexthop_vpc_id": " ",
"node_id": "vpc-09f62beb9a0e80aa0",
"node_name": "shared-vpc-dev",
"node_type": "VPC",
"prefix_cidr": "10.0.0.0/8",
"prefix_len": 8,
"reach_target": false,
"region": "us-west-2",
"routetable_id": "rtb-0b5e0c1c047799613",
"routetable_name": "shared-vpc-dmz-private-route-table-dev-usw2-az1",
"subnet_id": "subnet-0fd22d964b139d4b1",
"subnet_name": " ",
"vpc_id": "vpc-09f62beb9a0e80aa0",
"vpc_name": "shared-vpc-dev"
},
{
"account": "914515288968",
"nexthop_account": "914515288968",
"nexthop_asn": " ",
"nexthop_id": "tgw-0713acf411db9dbd7",
"nexthop_name": " ",

```
"nexthop_propagated": "no",
"nexthop_region": "ap-southeast-2",
"nexthop_status": "active",
"nexthop_type": "TGW_PEERING",
"nexthop_vpc_id": "vpc-0e38fc03871b35b29",
"node_id": "tgw-0e4197391d77f7d4a",
"node_name": "tgw-dev-us-west-2",
"node_type": "TGW",
"prefix_cidr": "10.116.133.0/24",
"prefix_len": 24,
"reach_target": false,
"region": "us-west-2",
"routetable_id": " ",
"routetable_name": " ",
"subnet_id": " ",
"subnet_name": " ",
"vpc_id": " ",
"vpc_name": " "
},
{
"account": "914515288968",
"nexthop_account": "018490922089",
"nexthop_asn": " ",
"nexthop_id": "vpc-4faea02b",
"nexthop_name": " ",
"nexthop_propagated": "yes",
"nexthop_region": "ap-southeast-2",
"nexthop_status": "active",
"nexthop_type": "TGW_VPC",
"nexthop_vpc_id": "vpc-4faea02b",
"node_id": "tgw-0713acf411db9dbd7",
"node_name": "tgw-dev-ap-southeast-2",
"node_type": "TGW_PEERING",
"prefix_cidr": "10.116.133.0/24",
"prefix_len": 24,
"reach_target": false,
"region": "ap-southeast-2",
"routetable_id": " ",
"routetable_name": " ",
"subnet_id": " ",
"subnet_name": " ",
"vpc_id": "vpc-0e38fc03871b35b29",
"vpc_name": " "
},
{
"account": "018490922089",
"nexthop_account": "018490922089",
"nexthop_asn": " ",
"nexthop_id": "local",
"nexthop_name": " ",
"nexthop_propagated": "no",
"nexthop_region": "ap-southeast-2",
"nexthop_status": "active",
"nexthop_type": "Local",
"nexthop_vpc_id": " ",
"node_id": "vpc-4faea02b",
"node_name": " ",
"node_type": "TGW_VPC",
"prefix_cidr": "10.116.133.0/24",
"prefix_len": 24,
"reach_target": true,
"region": "ap-southeast-2",
"routetable_id": "rtb-c145f2a6",
"routetable_name": " ",
"subnet_id": "subnet-0132c06aa4980be62",
"subnet_name": "neteng-tgw-2a",
"vpc_id": "vpc-4faea02b",
"vpc_name": "ceng-vpc-dev-apsoutheast2"
}
]
```

In the above example, the transmission path object describes a first data routing node "vpc-09f62beb9a0e80aa0," where the corresponding node type metadata indicates a VPC and the corresponding node identifier metadata indicates 09f62beb9a0e80aa0. The transmission path object also describes a second data routing node "tgw-0e4197391d77f7d4a," where the corresponding node type metadata indicates a TGW and the corresponding node identifier metadata indicates 0e4197391d77f7d4a. The transmission path object also describes a third data routing node "tgw-0713acf411db9dbd7," where the corresponding node type metadata indicates a TGW and the corresponding node identifier metadata indicates 0713acf411db9dbd7. The transmission path object also describes a fourth data routing node "vpc-4faea02b," where the corresponding node type metadata indicates a VPC and the corresponding node identifier metadata indicates 4faea02b. The transmission path object also describes a last data routing node "local," where the corresponding node type metadata indicates a local gateway.

Continuing from the above example, the transmission path object describes a first transmission path from the first data routing node to the second data routing node, a second transmission path from the second data routing node to the third data routing node, a third transmission path from the third data routing node to the fourth data routing node, and a fourth transmission path from the fourth data routing node to the last data routing node.

Referring back to FIG. 8, subsequent to step/operation 812, the method 800 proceeds to block 814 and ends.

Referring now to FIG. 10A, FIG. 10B, FIG. 10C, and FIG. 10D, example diagrams illustrating example data object transmissions in accordance with some embodiments of the present disclosure are provided.

Figure 10A:
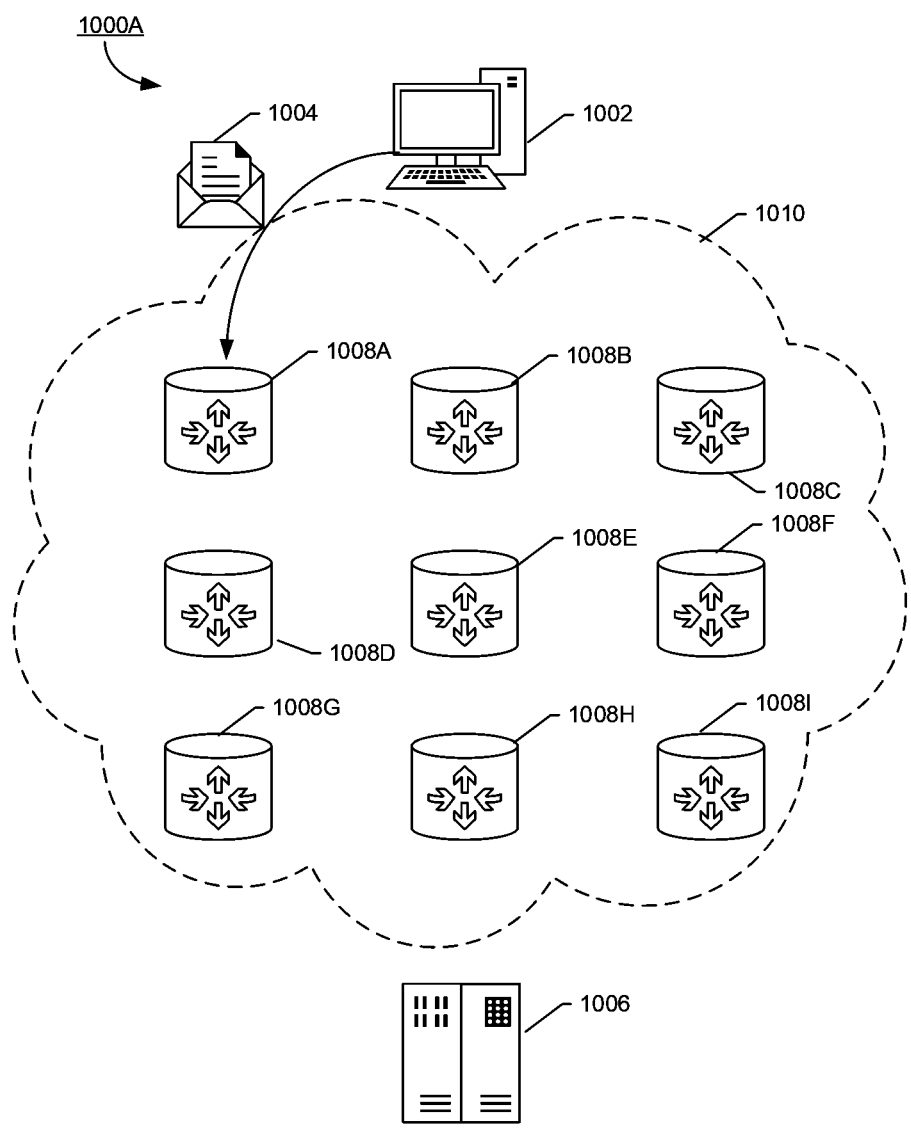

In the example diagram 1000A shown in FIG. 10A, an example source device 1002 may transmit an example data object 1004 to an example network service cloud 1010. In some embodiments, the example data object 1004 is transmitted or to be transmitted from the example source device 1002 to an example destination device 1006. In some embodiments, the example data object 1004 may be associated with a source address metadata that corresponds to the network address of the example source device 1002, and a destination address metadata that corresponds to the network address of the example destination device 1006.

In some embodiments, the example network service cloud 1010 comprises a plurality of data routing nodes, such as, but not limited to, an example data routing node 1008A, an example data routing node 1008B, an example data routing node 1008C, an example data routing node 1008D, an example data routing node 1008E, an example data routing node 1008F, an example data routing node 1008G, an example data routing node 1008H, and an example data routing node 1008I. In some embodiments, the example network service cloud 1010 provides one or more transmission paths for transmitting the example data object 1004 to the destination device 1006.

In some embodiments, a processing circuitry (such as a processing circuitry of a path finder server entity that includes, but not limited to, the processor 305 of the network service server 107A described above in connection with FIG. 1 and FIG. 3) may determine the transmission path(s) of the example data object 1004. For example, based at least in part on the source address metadata of the example data object 1004, the processing circuitry may retrieve an initial data routing table object, and determine first node type metadata and first node identifier metadata associated with the example data routing node 1008A based at least in part on the source address metadata and the initial data routing table object, similar to those described above in connection with FIG. 1 to FIG. 9. In this example, the processing circuitry determines a first transmission path of transmitting the example data object 1004 from the example source device 1002 to the example data routing node 1008A.

In some embodiments, the processing circuitry may transmit an API call request to a first API associated with the network service cloud 1010 for a first data routing table object correspond to the example data routing node 1008A. In some embodiments, the processing circuitry may receive an API call response from the first API associated with the network service cloud 1010 comprising the first data routing table object.

Figure 10B:
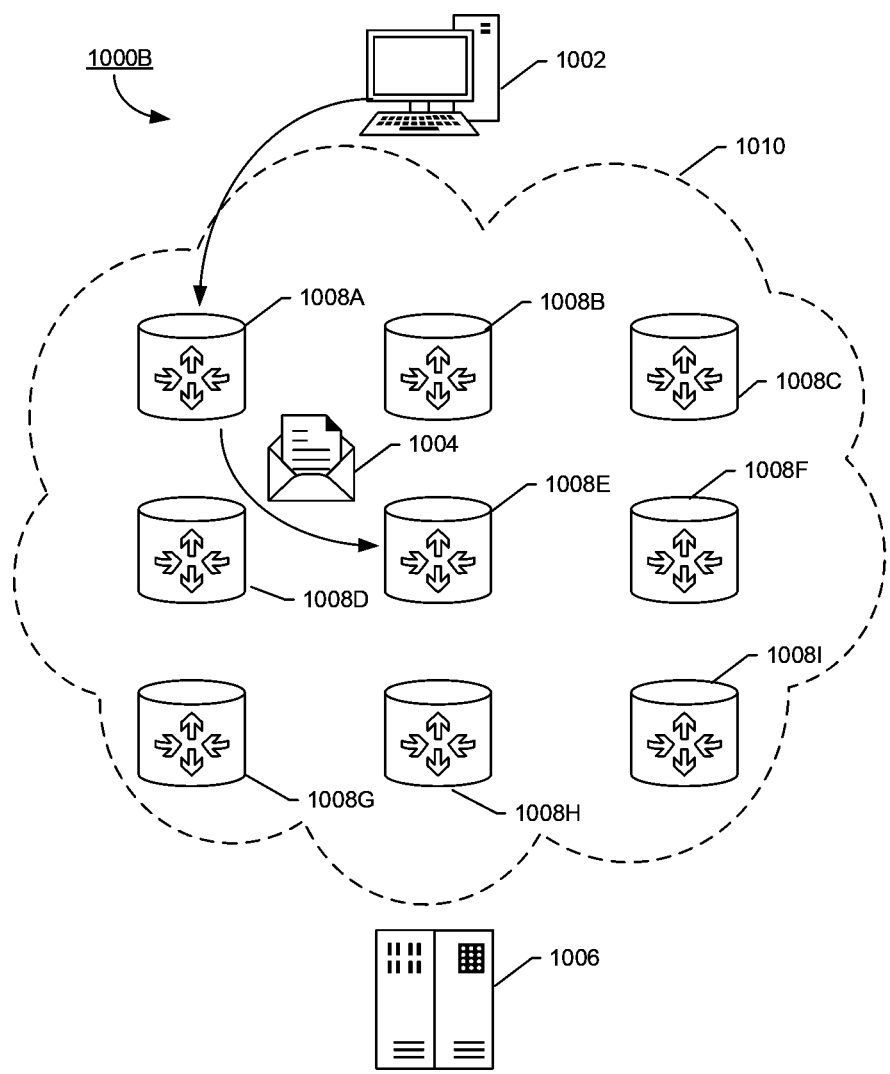

Referring now to FIG. 10B, the processing circuitry may determine second node type metadata and second node identifier metadata associated with the example data routing node 1008E based at least in part on the destination address metadata associated with the example data object 1004 and the first data routing table object, similar to those described above in connection with FIG. 1 to FIG. 9. In this example, the processing circuitry determines a second transmission path of transmitting the example data object 1004 from the example data routing node 1008A to the example data routing node 1008E, as shown in the example diagram 1000B.

In some embodiments, the processing circuitry may transmit an API call request to a second API associated with the network service cloud 1010 for a second data routing table object correspond to the example data routing node 1008E. In some embodiments, the processing circuitry may receive an API call response from the second API associated with the network service cloud 1010 comprising the second data routing table object. In some embodiments, the second API is the same as the first API. In some embodiments, the second API is different from the first API.

Figure 10C:
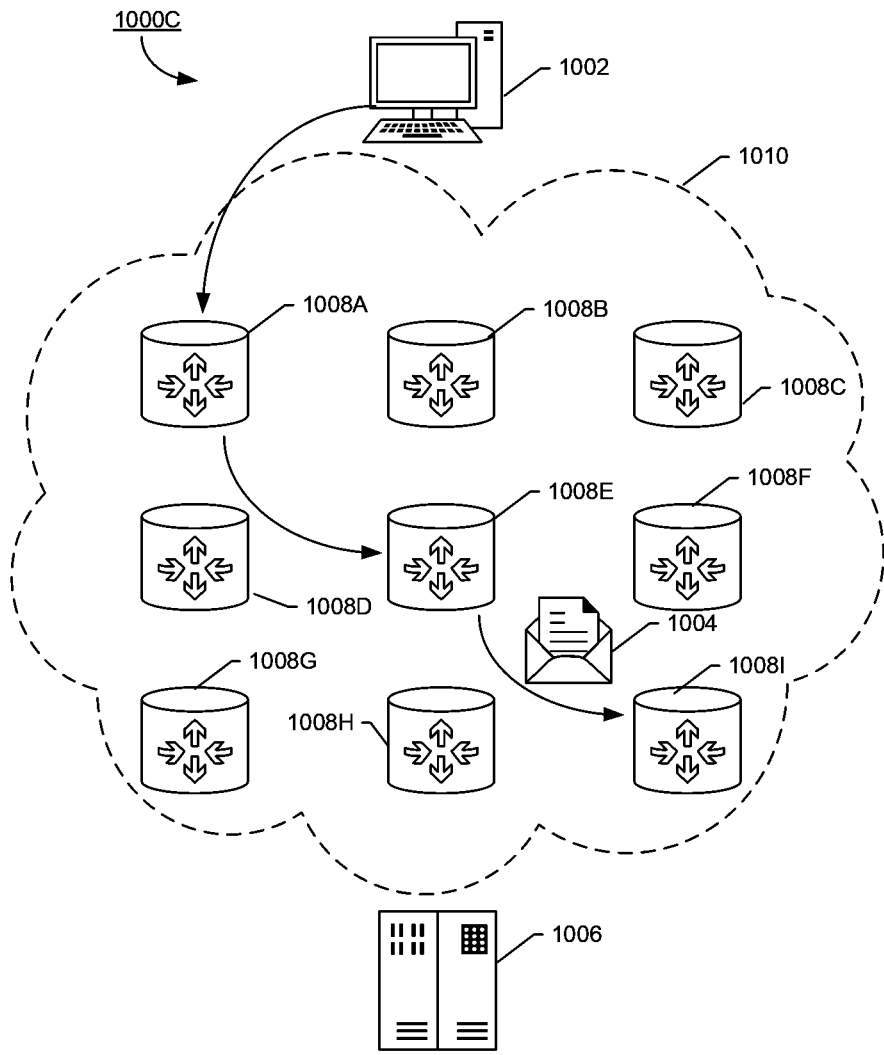

Referring now to FIG. 10C, the processing circuitry may determine third node type metadata and third node identifier metadata associated with the example data routing node 1008I based at least in part on the destination address metadata associated with the example data object 1004 and the second data routing table object, similar to those described above in connection with FIG. 1 to FIG. 9. In this example, the processing circuitry determines a third transmission path of transmitting the example data object 1004 from the example data routing node 1008E to the example data routing node 1008I, as shown in the example diagram 1000C.

Figure 10D:
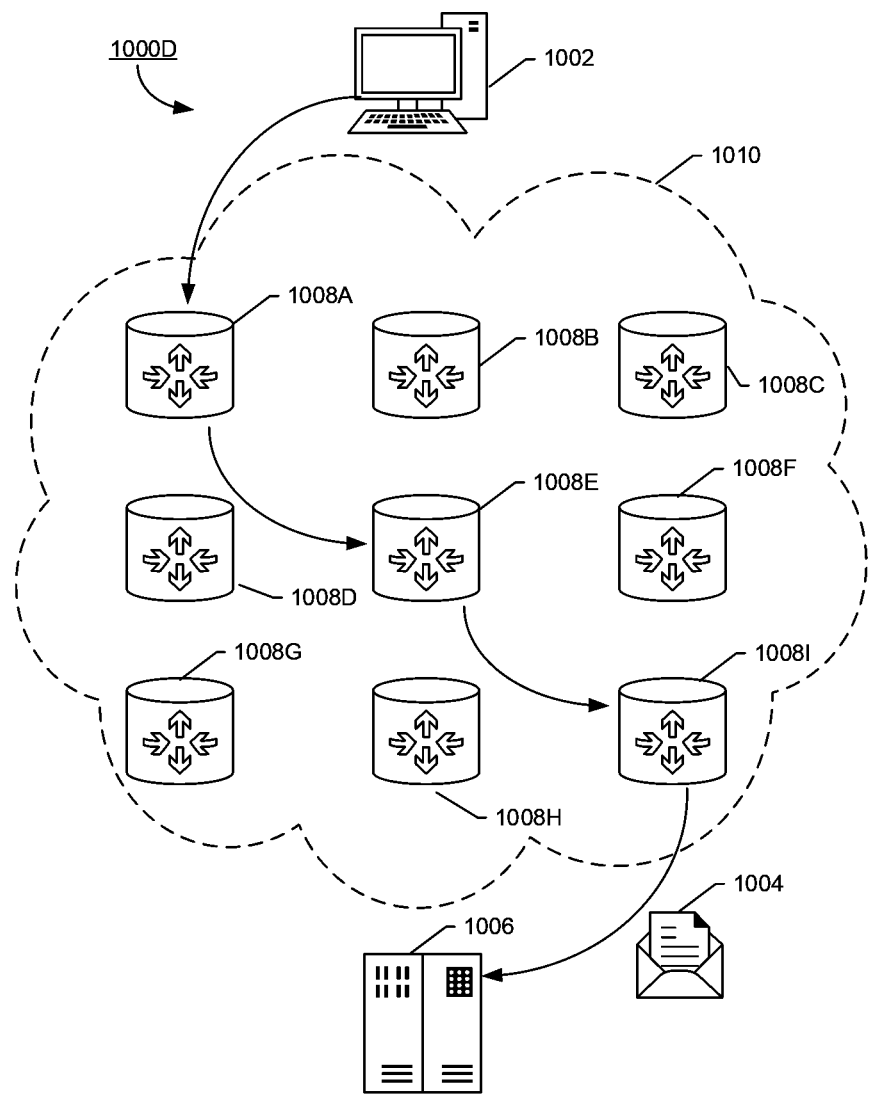

Referring now to FIG. 10D, the processing circuitry may determine that the third node type metadata associated with the example data routing node 1008I corresponds to a predefined final node type, similar to those described above in connection with at least FIG. 8 and FIG. 9. In this example, the processing circuitry determines a final transmission path of transmitting the example data object 1004 from the example data routing node 1008I to the example destination device 1006, as shown in the example diagram 1000D.

As such, in the example shown in FIG. 10A to FIG. 10D, the processing circuitry may programmatically determine that transmission paths of the example data object 1004 in the network service cloud 1010 comprise a first transmission path from the example source device 1002 to the example data routing node 1008A, a second transmission path from the example data routing node 1008A to the example data routing node 1008E, a third transmission path from the example data routing node 1008E to the example data routing node 1008I, and a final transmission path from the example data routing node 1008I to the example destination device 1006.

Referring now to FIG. 11, an example method 1100 is illustrated. In particular, the example method 1100 illustrates example steps/operations of diagnosing data object transmissions in accordance with example embodiments of the present disclosure.

In the example shown in FIG. 11, the example method 1100 starts at block 1101 and then proceeds to step/operation 1103. At step/operation 1103, a processing circuitry (such as a processing circuitry of a path finder server entity that includes, but not limited to, the processor 305 of the network service server 107A described above in connection with FIG. 1 and FIG. 3) may determine whether a data routing node in a network service cloud is associated with a faulty status.

In some embodiments, the network service cloud may record the real-time status of each data routing node in the network service cloud. For example, when a data routing node is carrying more data than it can handle, the data routing node may fail to transmit/deliver data objects in time. In this example, the network service cloud may assign the data routing node with a faulty status, which may indicate that the data routing node has a reduced capacity or no capacity at all to transmit/deliver data objects.

For example, if the processing circuitry determines that a data routing node encounters a runtime error, the processing circuitry will assign the data routing node with a faulty status. Additionally, or alternatively, if the processing circuitry determines that a data routing node is not associated with a data routing table object, the processing circuitry will assign the data routing node with a faulty status. Additionally, or alternatively, if the processing circuitry determines that a data routing node is associated with an internal address but the previous data routing node in the data transmission path is associated with a node type metadata indicating IGW, the processing circuitry will assign the data routing node with a faulty status.

If, at step/operation 1103, the processing circuitry determines that the data routing node is associated with a faulty status, the example method 1100 proceeds to step/operation 1105. At step/operation 1105, a processing circuitry (such as a processing circuitry of a path finder server entity that includes, but not limited to, the processor 305 of the network service server 107A described above in connection with FIG. 1 and FIG. 3) may update the data routing table object and/or the data routing protocol set associated with data routing node in response to determining that the data routing node is associated with a faulty status.

As described above, the data routing table object may define a data routing protocol set that specifies transmission paths within and between various data routing nodes. For example, prior to determining that a second data routing node is associated with a faulty status, the data routing table object may specify a transmission path from the first data routing node to the second data routing node. In some embodiments, in response to determining that the second data routing node is associated with a faulty status, the processing circuitry may determine third node type metadata and third node identifier metadata associated with a third data routing node (that is not associated with a faulty status). In some embodiments, the processing circuitry may update the data routing table object and/or the data routing protocol set to remove the transmission path from the first data routing node to the second data routing node, and to add a transmission path from the first data routing node to the third data routing node.

Referring now to FIG. 12A and FIG. 12B, example diagrams illustrating example data object transmissions in accordance with some embodiments of the present disclosure are provided.

In the example diagram 1200A shown in FIG. 12A, an example source device 1202 may transmit an example data object 1204 to an example network service cloud 1210. In some embodiments, the example data object 1204 is to be transmitted from the example source device 1202 to an example destination device 1206. In some embodiments, the example data object 1204 may be associated with a source address metadata that corresponds to the network address of the example source device 1202, and a destination address metadata that corresponds to the network address of the example destination device 1206.

In some embodiments, the example network service cloud 1210 comprises a plurality of data routing nodes, such as, but not limited to, an example data routing node 1208A, an example data routing node 1208B, an example data routing node 1208C, an example data routing node 1208D, an example data routing node 1208E, an example data routing node 1208F, an example data routing node 1208G, an example data routing node 1208H, and an example data routing node 1208I.

In some embodiments, the example network service cloud 1210 provides one or more transmission paths for transmitting the example data object 1204 to the destination device 1206. In the example shown in FIG. 12A, the transmission paths of the example data object 1204 in the network service cloud 1210 comprise a first transmission path from the example source device 1202 to the example data routing node 1208A, a second transmission path from the example data routing node 1208A to the example data routing node 1208E, a third transmission path from the example data routing node 1208E to the example data routing node 1208I, and a final transmission path from the example data routing node 1208I to the example destination device 1206.

In some embodiments, the processing circuitry may determine that the example data routing node 1208I is associated with a faulty status based on, for example, step/operation 1103 of FIG. 11 described above. In response to determining that the example data routing node 1208I is associated with the faulty status, the processing circuitry may update the data routing table object and/or the data routing protocol set associated with the example data routing node 1208E to redirect data objects so that, instead of transmitting data objects to the example data routing node 1208I, the example data routing node 1208E transmits data objects to the example data routing node 1208G.

Referring now to FIG. 12B, an updated data object transmission is shown in diagram 1200B. In the example shown in diagram 1200B, the transmission paths of the example data object 1204 in the network service cloud 1210 comprise a first transmission path from the example source device 1202 to the example data routing node 1208A, a second transmission path from the example data routing node 1208A to the example data routing node 1208E, a third transmission path from the example data routing node 1208E to the example data routing node 1208G (instead of the example data routing node 1208I), and a final transmission path from the example data routing node 1208G (instead of the example data routing node 1208I) to the example destination device 1206.

Referring back to FIG. 11, subsequent to step/operation 1105, the method 1100 proceeds to block 1107 and ends.

If, at step/operation 1103, the processing circuitry determines that the data routing node is not associated with a faulty status, the example method 1100 proceeds to block 1107 and ends.

Additional Implementation Details

Although example processing systems have been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. A computer-readable storage medium can be, or be included in, a computer-readable storage device, a computer-readable storage substrate, a random or serial access memory array or device, or a combination of one or more of them. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random-access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer needs not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., an LCD monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML (Hypertext Markup Language) page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as description of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

The invention claimed is:

1. An apparatus comprising at least one processor and at least one non-transitory memory comprising program code, the at least one non-transitory memory and the program code configured to, with the at least one processor, cause the apparatus to at least:
   determine a source address metadata and a destination address metadata of a data object associated with a network service cloud, wherein the network service cloud comprises a plurality of data routing nodes;
   retrieve, based at least in part on the source address metadata, an initial data routing table object, wherein the initial data routing table object defines an initial data routing protocol set;
   determine, based at least in part on the initial data routing protocol set, first node type metadata and first node identifier metadata associated with a first data routing node;
   transmit, based at least in part on at least one of the first node type metadata or the first node identifier metadata, a first Application Programming Interface (API) call request to a first API associated with the network service cloud for a first data routing table object associated with the first data routing node;
   in response to receiving a first API call response comprising the first data routing table object, determine second node type metadata and second node identifier metadata associated with a second data routing node based at least in part on the destination address metadata and the first data routing table object; and
   generate a transmission path object representing a data object transmission associated with the data object based at least in part on the first node type metadata, the first node identifier metadata, the second node type metadata, and the second node identifier metadata.

2. The apparatus of claim 1, wherein, when retrieving the initial data routing table object, the at least one non-transitory memory and the program code are configured to, with the at least one processor, cause the apparatus to:
   determine whether the source address metadata satisfies a first network address range associated with an initial data routing node of the plurality of data routing nodes.

3. The apparatus of claim 2, wherein the first network address range is defined by at least one network address allocation protocol associated with the initial data routing node.

4. The apparatus of claim 2, wherein the at least one non-transitory memory and the program code are configured to, with the at least one processor, cause the apparatus to:
   in response to determining that the source address metadata satisfies the first network address range, retrieve the initial data routing table object corresponding to the first network address range.

5. The apparatus of claim 2, wherein the at least one non-transitory memory and the program code are configured to, with the at least one processor, cause the apparatus to:
   in response to determining that the source address metadata does not satisfy the first network address range, generate an error notification.

6. The apparatus of claim 2, wherein the at least one non-transitory memory and the program code are configured to, with the at least one processor, cause the apparatus to:
   in response to determining that the source address metadata does not satisfy the first network address range, determine whether the source address metadata satisfies a second network address range associated with an alternative data routing node of the plurality of data routing nodes.

7. The apparatus of claim 1, wherein the initial data routing protocol set defines a plurality of destination address ranges, wherein, when determining the first node type metadata and the first node identifier metadata, the at least one non-transitory memory and the program code are configured to, with the at least one processor, cause the apparatus to further:
   select a longest matching destination address range from the plurality of destination address ranges; and
   determine the first node type metadata and the first node identifier metadata corresponding to the longest matching destination address range.

8. A computer-implemented method comprising:
   determining a source address metadata and a destination address metadata of a data object associated with a network service cloud, wherein the network service cloud comprises a plurality of data routing nodes;
   retrieving, based at least in part on the source address metadata, an initial data routing table object, wherein the initial data routing table object defines an initial data routing protocol set;
   determining, based at least in part on the initial data routing protocol set, first node type metadata and first node identifier metadata associated with a first data routing node;
   transmitting, based at least in part on at least one of the first node type metadata or the first node identifier metadata, a first Application Programming Interface (API) call request to a first API associated with the network service cloud for a first data routing table object associated with the first data routing node;
   in response to receiving a first API call response comprising the first data routing table object, determining second node type metadata and second node identifier metadata associated with a second data routing node based at least in part on the destination address metadata and the first data routing table object; and
   generating a transmission path object representing a data object transmission associated with the data object based at least in part on the first node type metadata, the first node identifier metadata, the second node type metadata, and the second node identifier metadata.

9. The computer-implemented method of claim 8, wherein retrieving the initial data routing table object further comprises:
   determining whether the source address metadata satisfies a first network address range associated with an initial data routing node of the plurality of data routing nodes.

10. The computer-implemented method of claim 9, wherein the first network address range is defined by at least one network address allocation protocol associated with the initial data routing node.

11. The computer-implemented method of claim 9 further comprising:
   in response to determining that the source address metadata satisfies the first network address range, retrieving the initial data routing table object corresponding to the first network address range.

12. The computer-implemented method of claim 9 further comprising:
   in response to determining that the source address metadata does not satisfy the first network address range, generating an error notification.

13. The computer-implemented method of claim 9 further comprising:

in response to determining that the source address metadata does not satisfy the first network address range, determining whether the source address metadata satisfies a second network address range associated with an alternative data routing node of the plurality of data routing nodes.

14. The computer-implemented method of claim 8, wherein the initial data routing protocol set defines a plurality of destination address ranges, wherein determining the first node type metadata and the first node identifier metadata further comprises:

selecting a longest matching destination address range from the plurality of destination address ranges; and determining the first node type metadata and the first node identifier metadata corresponding to the longest matching destination address range.

15. A computer program product comprising at least one non-transitory computer-readable storage medium having computer-readable program code portions stored therein, the computer-readable program code portions comprising an executable portion configured to:

determine a source address metadata and a destination address metadata of a data object associated with a network service cloud, wherein the network service cloud comprises a plurality of data routing nodes;

retrieve, based at least in part on the source address metadata, an initial data routing table object, wherein the initial data routing table object defines an initial data routing protocol set;

determine, based at least in part on the initial data routing protocol set, first node type metadata and first node identifier metadata associated with a first data routing node;

transmit, based at least in part on at least one of the first node type metadata or the first node identifier metadata, a first Application Programming Interface (API) call request to a first API associated with the network service cloud for a first data routing table object associated with the first data routing node;

in response to receiving a first API call response comprising the first data routing table object, determine second node type metadata and second node identifier metadata associated with a second data routing node based at least in part on the destination address metadata and the first data routing table object; and generate a transmission path object representing a data object transmission associated with the data object based at least in part on the first node type metadata, the first node identifier metadata, the second node type metadata, and the second node identifier metadata.

16. The computer program product of claim 15, wherein the computer-readable program code portions comprise the executable portion configured to:

determine whether the source address metadata satisfies a first network address range associated with an initial data routing node of the plurality of data routing nodes.

17. The computer program product of claim 16, wherein the first network address range is defined by at least one network address allocation protocol associated with the initial data routing node.

18. The computer program product of claim 16, wherein the computer-readable program code portions comprise the executable portion configured to:

in response to determining that the source address metadata satisfies the first network address range, retrieve the initial data routing table object corresponding to the first network address range.

19. The computer program product of claim 16, wherein the computer-readable program code portions comprise the executable portion configured to:

in response to determining that the source address metadata does not satisfy the first network address range, generate an error notification.

20. The computer program product of claim 16, wherein the computer-readable program code portions comprise the executable portion configured to:

in response to determining that the source address metadata does not satisfy the first network address range, determine whether the source address metadata satisfies a second network address range associated with an alternative data routing node of the plurality of data routing nodes.

* * * * *